United States Patent
Kawazoe et al.

(10) Patent No.: US 7,292,265 B2
(45) Date of Patent: Nov. 6, 2007

(54) CAMERA APPARATUS, A CAMERA SYSTEM, AND A METHOD FOR CONTROLLING THE CAMERA SYSTEM

(75) Inventors: Shuuji Kawazoe, Yokohama (JP); Haruo Kogane, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 792 days.

(21) Appl. No.: 10/679,155

(22) Filed: Oct. 3, 2003

(65) Prior Publication Data
US 2004/0114037 A1  Jun. 17, 2004

(30) Foreign Application Priority Data
Oct. 4, 2002  (JP) ............... 2002-292441

(51) Int. Cl.
H04N 5/225 (2006.01)
H04N 7/18 (2006.01)

(52) U.S. Cl. ....................... 348/169; 348/135
(58) Field of Classification Search ............... 348/169, 348/352, 135, 143; 345/419
See application file for complete search history.

(56) References Cited

U.S. PATENT DOCUMENTS

| | | | |
|---|---|---|---|
| 5,801,770 A | | 9/1998 | Paff et al. |
| 6,124,862 A | * | 9/2000 | Boyken et al. ............. 345/419 |
| 6,404,455 B1 | * | 6/2002 | Ito et al. ..................... 348/169 |
| 6,507,366 B1 | * | 1/2003 | Lee ............................ 348/352 |

FOREIGN PATENT DOCUMENTS

| | | |
|---|---|---|
| JP | 54-145430 | 11/1979 |
| JP | 3-104675 | 6/1993 |
| JP | 6245125 | 9/1994 |
| WO | WO92/04641 | 3/1992 |
| WO | WO95/35627 | 12/1995 |

* cited by examiner

*Primary Examiner*—Allen Wong
(74) *Attorney, Agent, or Firm*—Pearne & Gordon LLP

(57) ABSTRACT

Providing camera apparatus and a camera system capable of performing optimum speed control by themselves and even facilitate tracking of a subject by way of a plurality of cameras while using a same controller, even in case the location of the camera or the distance between the camera and the subject has changed, and a method for controlling the camera system The camera apparatus includes: a camera for photographing a subject; a rotating body for rotating the camera in order to track the subject; and a controller for controlling the motion of the rotating body and the operation of the camera; characterized in that the controller includes: an operation determination unit for analyzing and determining the input operation instruction information on the rotating body and the camera; a data holding unit for holding the status information on the photographing operation of the camera; a main control unit for calculating an optimum speed to track the subject based on the information output from the operation determination unit and the data holding unit and outputting the speed to the rotating body; and a drive unit for driving the rotating body.

14 Claims, 11 Drawing Sheets

CAMERA APPARATUS, A CAMERA SYSTEM, AND A METHOD FOR CONTROLLING THE CAMERA SYSTEM

BACKGROUND OF THE INVENTION

1. Field of the Invention

The present invention relates to a camera, zooming means, focusing means, motion detection means and a power source provided in combination, and in particular to camera apparatus and a camera system which are capable of performing speed control of a rotating body facilitating tracking of a subject and are preferably used for surveillance, crime prevention and monitoring, and a method for controlling the camera system.

2. Description of the Related Art

A surveillance camera, a security camera or a monitor camera equipped with a zooming function and a focusing mechanism (hereinafter referred to as a composite camera) is known. A composite camera is also known comprising a rotating body (panhead) equipped with a rotating mechanism which can rotate the camera main body in order to keep photographing a subject by changing the photographing direction following the motion of the subject.

In the related art, there is known a composite camera for tracking a subject with a composite camera attached is known which performs speed control dependent on the zooming magnification information held in the camera irrespective of the environment of the location of the rotating body or distance to the subject (refer to, for example, the Japanese Patent Laid-Open No. 145430/1979, pp. 1-2). Also is known a composite camera which adjusts and controls the swivel speed in accordance with the angle of the camera direction with respect to the subject (refer to, for example, the Japanese Utility Model Laid-Open No. 47933/1993, p3).

However, on the former composite camera which performs speed control depending on the zooming magnification information held in the camera alone, it is difficult to track a subject at an optimum speed in case the height of the camera location or distance to the subject has changed.

On the other hand, on the latter composite camera which adjusts and controls the swivel speed in accordance with the angle of the camera direction, there remains the problem: in case the angle of the camera direction is the sole information available, it is possible to capture a subject within the sight but could be impossible to focus on the subject when the distance to the camera changed while the subject was moving.

For example, in a system which operates and controls a plurality of cameras using a same controller, it may be necessary to employ separate operations for separate cameras. The composite camera according to the related art cannot possibly address this problem.

SUMMARY OF THE INVENTION

Thus, an object of the invention is to provide camera apparatus and a camera system which use not only zooming magnification information but also a variety of other information to perform optimum speed control by themselves and even facilitate tracking of a subject by way of a plurality of cameras while using a same controller, even in case the location of the camera or the distance between the camera and the subject has changed, and a method for controlling the camera system.

In order to solve the problem, camera apparatus according to the invention comprises: a camera for photographing a subject; a rotating body for rotating the camera in order to track the subject; and a controller for controlling the motion of the rotating body and the photographing operation of the camera; wherein the controller comprises:

operation determination means for analyzing and determining the input operation instruction information on the rotating body and the camera;

data holding means for holding the status information on the photographing operation of the camera;

main control means for calculating an optimum speed to track the subject based on the information output from the operation determination means and the data holding means and outputting the speed to the rotating body; and drive means for driving the rotating body.

With this configuration, by using not only zooming magnification information but also a variety of other information, it is possible for the camera to perform optimum speed control by itself even in case the location of the camera or the distance between the camera and a subject has changed. As a result, it is made easy to track the subject by way of a plurality of cameras while using a same controller.

The camera apparatus according to the invention is characterized in that the data holding means holds information on the distance from the camera to the subject obtained by way of focusing control as the status information to be output to the main control means.

As a result, incase the distance to the subject has changed, it is possible to readily track the subject without experiencing a difference in the operability caused by the difference in the distance.

The camera apparatus according to the invention is characterized in that the data holding means holds information on the distance from the camera to the floor obtained by way of focusing control as the status information to be output to the main control means.

As a result, in case the height of the camera location has changed, it is possible to readily track the subject without experiencing a difference in the operability caused by the difference in the height of the camera location.

The camera apparatus according to the invention is characterized in that the data holding means holds information on the orientation of the rotating body in vertical direction as the status information to be output to the main control means.

With this configuration, the data holding means outputs, as status information, the orientation of the rotating body in vertical direction obtained by way of operation control of the rotating body to the main control means.

As a result, it is possible to readily track the subject without experiencing a difference in the operability caused by the difference in the orientation of the camera in vertical direction.

The camera apparatus according to the invention is characterized in that the data holding means holds information on the orientation of the rotating body in horizontal direction as the status information to be output to the main control means.

As a result, it is possible to readily track the subject without experiencing a difference in the operability caused by the difference in the orientation of the camera in horizontal direction.

The camera apparatus according to the invention is characterized in that the data holding means holds information on the motion detection information on the rotating body as the status information to be output to the main control means.

As a result, it is possible for the camera to perform optimum speed control by itself in consideration of the operation of the subject, thus facilitating tracking of the subject.

The camera apparatus according to the invention is characterized in that the data holding means holds the user-specific information as the status information to be output to the main control means.

By considering the operability different depending on the operator even under the same controller, it is possible to readily track the subject.

The camera apparatus according to the invention is characterized in that the data holding means holds a combination of information on the distance to the subject, information on the distance to the floor, information on the orientation in vertical direction, information on the orientation in horizontal direction, zooming magnification information as internal information of the camera, motion detection information, and user-specific information, as the status information to be output to the main control means.

Thus, it is possible to readily track the subject without experiencing a difference in the position of the subject, height of the camera location, or operability.

The camera apparatus according to the invention is characterized in that the data holding means holds a combination of the information on the distance to the subject, the information on the distance to the floor, the information on the orientation in vertical direction, the information on the orientation in horizontal direction, the zooming magnification information, the motion detection information, and the user-specific information, as the status information to be output to the main control means, in correspondence to a specific function.

In case generally the subject need not be deliberately tracked but it must be deliberately tracked depending on the situation, it is possible to select operation which facilitates tracking of the subject by using a specific function.

The camera apparatus according to the invention is characterized in that the data holding means holds all the information including the information on the distance to the subject, the information on the distance to the floor, the information on the orientation in vertical direction, the information on the orientation in horizontal direction, the zooming magnification information, the motion detection information, and the user-specific information, as the status information to be output to the main control means.

Thus, it is possible to readily track the subject without experiencing a difference in the position of the subject, height of the camera location, or operability.

A camera system according to the invention is characterized in that the camera apparatus including a camera and a controller comprises:

a display unit for displaying the image information from the camera and at least any of the camera status information, operation instruction information, and user-specific information set to the camera in accordance with an instruction from the operation determination means and that the controller comprises display signal generation means for displaying the information on the display unit.

As a result, in case a same controller is used in turns by a plurality of persons in separate time zones, it is possible to readily track the subject with the operability fit for each operator.

The camera system according to the invention is characterized in that the controller comprises:

transmission means for outputting the status information held by the data holding means to an input operation unit for inputting operation instruction information to the controller in order to perform operation on the rotating body and the camera and that the controller outputs the internal information of the camera held by the data holding means to the input operation unit via the transmission means.

As a result, even for a low-cost camera which cannot mount a speed control function, the controller can generate operation instruction information facilitating subject tracking so as to facilitate tracking of a subject, by providing the controller with status information.

A method for controlling the camera system according to the invention is a method for controlling the camera system comprising: a camera for photographing a subject; a rotating body for rotating the camera in order to track the subject; a controller for controlling the motion of the rotating body and the photographing operation of the camera; and an input operation unit for inputting operation instruction information to the controller in order to perform operation on the rotating body and the camera; characterized in that the controller comprises: operation determination means for analyzing and determining the operation instruction information input from the input operation unit; data holding means for holding the status information on the photographing operation of the camera; main control means for calculating an optimum speed to track the subject based on the information from the operation determination means and the data holding means and outputting the speed to the rotating body; and drive means for driving the rotating body; and that the method uses the camera motion detection information and the information on the distance to the subject as information to be output from the data holding means to the main control means to control the rotating body so that the subject will first appear in the center of the angle of view.

Even in case the controller is likely to be operated in excess to place a subject out of the angle of view at the moment tracking of the subject has started, subject tracking is made easy because the subject appears in the center of the angle of view and proper focus is attained just after subject tracking is started.

A method for controlling the camera system according to the invention is a method for controlling the camera system comprising: a camera for photographing a subject, a rotating body for rotating the camera in order to track the subject; a controller for controlling the motion of the rotating body and the photographing operation of the camera; and an input operation unit for inputting operation instruction information to the controller in order to perform operation on the rotating body and the camera; characterized in that the controller comprises: operation determination means for analyzing and determining the operation instruction information input from the input operation unit; data holding means for holding the status information on the photographing operation of the camera; main control means for calculating an optimum speed to track the subject based on the information from the operation determination means and the data holding means and outputting the speed to the rotating body; and drive means for driving the rotating body; and that the method uses the camera motion detection information and the zooming magnification information as the internal information of the camera, as information to be output from the data holding means to the main control means, to control the rotating body so that the subject will first appear in the center of the angle of view.

A method for controlling the camera system according to the invention is a method for controlling the camera system comprising: a camera for photographing a subject, a rotating body for rotating the camera in order to track the subject; a controller for controlling the motion of the rotating body and the photographing operation of the camera; and an input operation unit for inputting operation instruction information to the controller in order to perform operation on the rotating body and the camera; characterized in that the controller comprises: operation determination means for analyzing and determining the operation instruction information input from the input operation unit; data holding means for holding the status information on the photographing operation of the camera; main control means for calculating an optimum speed to track the subject based on the information from the operation determination means and the data holding means and outputting the speed to the rotating body; and drive means for driving the rotating body; and that the method uses the camera motion detection information, the focusing information as internal information of the camera and the zooming magnification information as internal information of the camera, as information to be output from the data holding means to the main control means to control the rotating body so that the subject will first appear in the center of the angle of view.

With this configuration, for example, in case the controller is likely to be operated in excess to place a subject out of the angle of view at the moment tracking of the subject has started, subject tracking is made easy because the subject appears in the center of the angle of view and proper focus is attained just after subject tracking is started.

DESCRIPTION OF THE PREFERRED OF THE EMBODIMENTS

Embodiments of the invention will be detailed referring to the attached drawings.

First Embodiment

Figure 1:
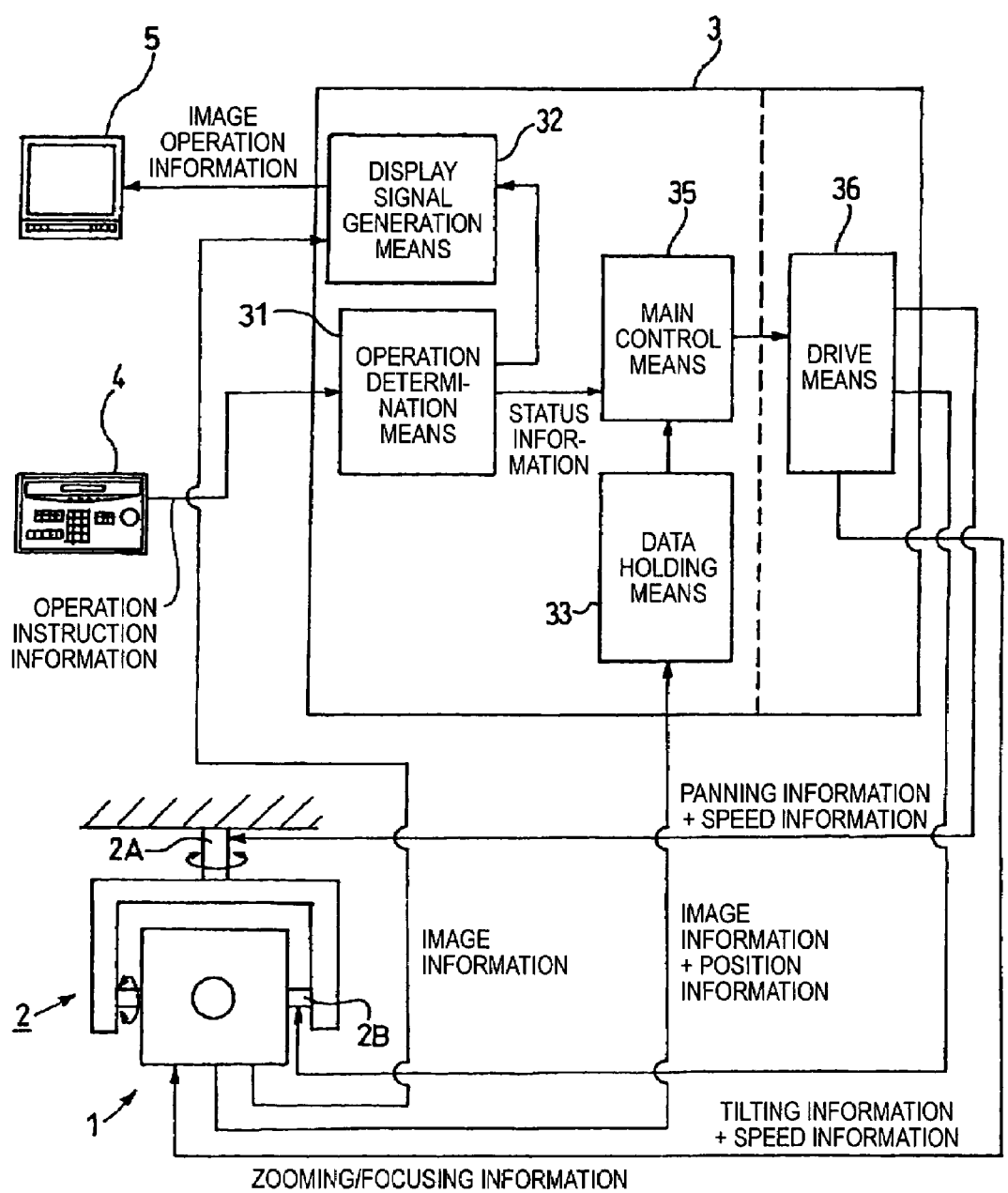
FIG. 1 is a block diagram showing a camera system comprising surveillance camera apparatus equipped with a function to control the speed of a rotating body according to the first embodiment of the invention.

FIG. 1 is a block diagram showing a camera system comprising surveillance camera apparatus equipped with a function to control the speed of a rotating body according to the first embodiment of the invention. The camera system drives the rotting body 2 based on the operation instruction information received from an input operation unit 4 mentioned later and the information on the distance to a subject held in a controller 3. The camera system generally comprises: surveillance camera apparatus including a camera main body 1, the rotating body 2 where the camera main body 1 is rotatably attached and the controller 3; the input operation unit 4; and a monitor unit 5.

The camera main body 1 is capable of performing panning and tilting operations (subject tracking operation) by way of the rotating body 2. Thus the rotating body 2 comprises a panning mechanism and a tilting mechanism as rotation means. Theses mechanisms are driven and controlled by the controller 3 and the input operation unit 4 mentioned later.

The camera main body 1 supports automatic operation as well as manual operation concerning the zooming mechanism and the focusing mechanism, respectively.

The controller 3 drives and controls the camera main body 1 as well as the rotating body 2. The controller 3 comprises operation determination means 31, display signal generation means 32, data holding means 33, main control means 35, and drive means 36, and is built into the camera main unit 1.

The operation determination means 31 inputs operation instruction information to the controller 3 in order to perform operation on the camera main body 1 and the rotating body 2. The input of the operation determination means 31 is connected to the output of the input operation unit 4. The output of the operation determination means 31 is connected to the input of the display signal generation means 32 and the input of the main control means 35.

The display signal generation means 32 generates a signal for displaying, on the monitor unit 5, the image information from the camera main body 1, the operation instruction information input from the input operation unit 4 and the status information on the camera main body 1. The input of the display signal generation means 32 is connected to the camera main body 1 and the output of the operation determination means 31. The output of the display signal generation means 32 is connected to the monitor unit 5.

The data holding means 33 holds various statuses (status information mentioned later) of the camera main body 1. The input of the data holding means 33 is connected to the output of the camera main body 1. The output of the data holding means 33 is connected to the main control means 35. The data holding means 33 stores and holds the image information and operation information from the camera main body 1.

The main control means 35 converts the speed of the rotating body 2 to an optimum operation speed and controls the rotating body 2 based on the data analyzed and determined by the operation determination means 31 (operation instruction information) and the status data on the camera main body 1 held by the data holding means 33 (status information). The input of the main control means 35 is connected to the output of the operation determination means 31, the data holding means 33 and the drive means 36.

The drive means 36, under control of the main control means 35, controls the operation of the camera main body 1 (for example, zooming and focusing) as well as performs rotates the rotating body 2 at a speed controlled and indicated by the main control means 35. For the rotating body 2, the drive means 36 comprises a first axis of rotation 2A and a second axis of rotation 2B (for these axes, see FIG. 1) of the panning mechanism and the tilting means (rotation means) and a first motor and a second motor (these are not shown) for rotating these axes.

The input operation unit 4 sets/inputs operation instruction information to the controller 3 in order to perform operation on the camera main body 1 and the rotating body 2. On the panel surface of the input operation unit 4 are arranged various operation buttons and operation tools. The output of the input operation unit 4 is connected to the input of the operation determination means 31.

The monitor unit 5 displays the status information held in the controller 3 and the operation instruction information set/input by the input operation unit 4. The input of the monitor unit 5 is connected to the output of the display signal generation means 32.

Figure 2:
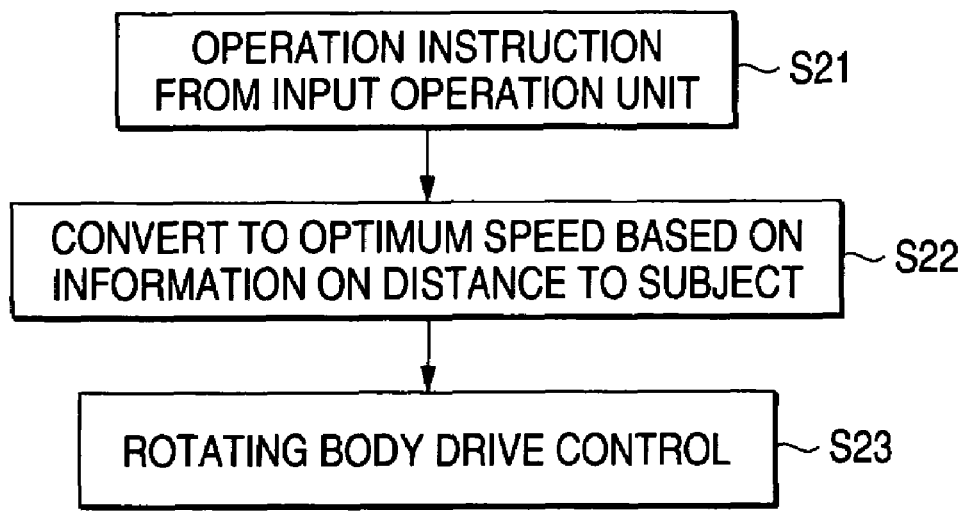
FIG. 2 is a flowchart of speed control of surveillance camera apparatus equipped with a function to control the speed of a rotating body according to the first embodiment of the invention, the speed control being performed by using the information on the distance to the subject.

FIG. 2 is a flowchart showing the operation of surveillance camera apparatus equipped with a function to control the speed of a rotating body according to the first embodiment of the invention. The flowchart comprises a first step S21 through a third step S23.

In FIG. 2, the first step S21 is a step of inputting and instructing the operation instruction information, in this example the operation speed instruction information on the rotating body 2 from the input operation unit 4;

the second step S22 is a step of performing arithmetic operation of an optimum speed based on the operation speed instruction information and the information on the distance from the camera main body 1 to the subject and converting the current operation speed to the optimum speed; and the third step S23 is a step of driving and controlling the rotating body 2.

The operation of the thus configured surveillance camera apparatus equipped with a function to control the speed of a rotating body according to the first embodiment of the invention will be described.

(1) In the first step S21, the operation speed (operation speed instruction information) on the rotating body 2 is input and instructed to the controller 3 by the input operation unit 4 shown in FIG. 1.

(2) In the second step S22, the status information held by the data holding means 33 of the controller 3, the information on the distance from the camera main body 1 to the subject in this embodiment, and the operation speed instruction information determined by the operation determination means 31 are input to the main control means 35. From these input information, the main control means 35 performs arithmetic operation of an optimum operation speed of the rotating body 2 to track the subject by using an appropriate arithmetic expression, Optimum speed=(Operation instruction information speed)+(Coefficient of the information on the distance to the subject)×(Operation instruction information speed)

in case for example the information on the distance to the subject is used, and converts the current operation speed to the resulting optimum speed.

(3) In the third step S23, a control signal corresponding to the optimum operation speed calculated by the main control means 35 of the controller 3 in the second step S22 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the first embodiment of the invention, the rotating body 2 of the surveillance camera apparatus equipped with a function to control the speed of a rotating body is controlled by using information on top of the information on the subject tracking speed and the zooming magnification information input and instructed from the input operation unit 4. The information on the subject tracking speed input and instructed from the input operation unit 4 as well as the information on the distance to the subject held by the controller are used to perform arithmetic operation of an optimum speed to track the subject and convert the current operation speed to the resulting speed obtained by the arithmetic operation. Thus it is possible to rotate the rotating body 2 at a speed which is based on the distance to the subject.

Second Embodiment

Figure 3:
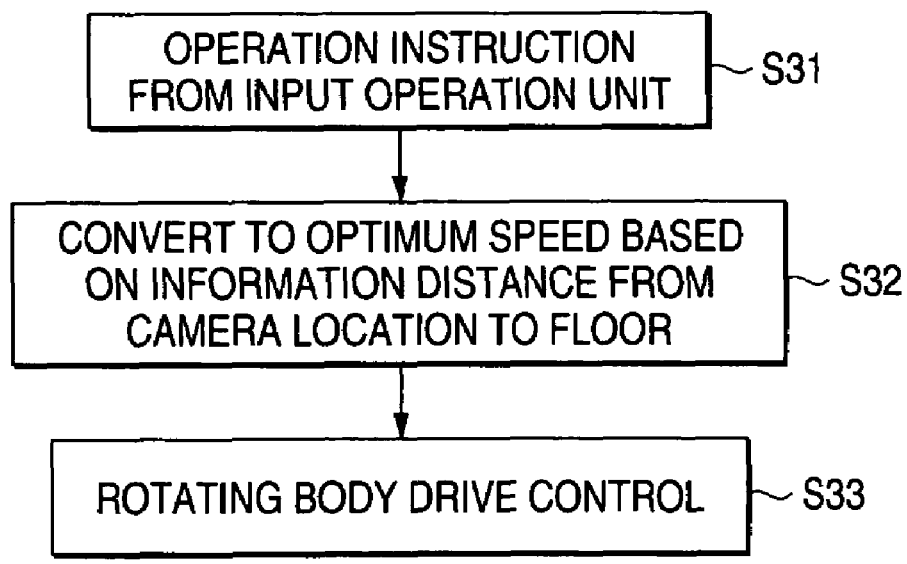
FIG. 3 is a flowchart of speed control of surveillance camera apparatus equipped with a function to control the speed of a rotating body according to the second embodiment of the invention, the speed control being performed by using the information on the distance from the camera location to the floor.

The second embodiment of the invention will be detailed referring to FIG. 3. In this embodiment, the same components as those in the first embodiment are given the same numerals and signs to avoid duplicate explanation.

The surveillance camera apparatus equipped with a function to control the speed of a rotating body according to the second embodiment of the invention performs arithmetic operation of an optimum speed and converts the current operation speed to the optimum speed based on the operation speed instruction information as operation instruction information input from the input operation unit 4 and the information on the distance from the camera location to the floor as status information held in the controller 3, and drives/controls the rotating body 2 at the optimum speed.

FIG. 3 is a flowchart showing the operation of the surveillance camera apparatus equipped with a function to control the speed of a rotating body according to the second embodiment of the invention. The flowchart comprises a first step S31 through a third step S33.

In FIG. 3, the first step S31 is a step of inputting and instructing the operation speed instruction information on the rotating body 2 from the input operation unit 4;

the second step S32 is a step of performing arithmetic operation of an optimum speed based on the operation speed instruction information in step S31 and the information on the distance from the camera location to the floor and converting the current operation speed to the optimum speed; and the third step S33 is a step of driving the rotating body 2.

Next, the operation of the thus configured surveillance camera apparatus equipped with a function to control the speed of a rotating body according to the second embodiment of the invention will be described.

(1) In the first step S31, same as the first step S21 in the first embodiment, the operation speed (operation speed instruction information) on the rotating body 2 is input and instructed to the controller 3 by the input operation unit 4 shown in FIG. 1.

(2) In the second step S32, the camera location information on the camera main body 1 held by the data holding means 33 of the controller 3, that is, the information on the distance from the location of the camera main body 1 to the floor, and the operation speed instruction information determined by the operation determination means 31 are input to the main control means 35. From these input information, the main control means 35 performs arithmetic operation of an optimum operation speed of the rotating body 2 to track the subject by using an appropriate arithmetic expression, same as the first embodiment, and converts the current operation speed to the resulting optimum speed.

(3) In the third step S33, same as the third step S23 in the first embodiment, a control signal corresponding to the optimum operation speed calculated by the main control means 35 of the controller 3 in the second step S32 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the second embodiment of the invention, the rotating body 2 of the surveillance camera apparatus equipped with a function to control the speed of a rotating body is controlled by using the operation speed instruction data from the input operation unit 4 and the information on the distance from the camera location to the floor held by the camera main body 1 to convert, in the interior of the camera, the current operation speed to an appropriate tracking speed. That is, according to the second embodiment of the invention, the rotating body 2 is driven by using information on top of the zooming magnification information. An optimum operation speed is calculated and the current operation speed is converted to the resulting speed also in consideration of an optimum speed depending on the height of the location of the camera main body 1. It is thus possible to drive the rotating body at the operation speed which facilitates subject tracking.

Thus, in case a plurality of cameras are installed at locations whose distances to the floor differ from each other and a same controller is used to operate the plurality of cameras, the same operability is obtained at any time without experiencing a difference in the operability caused by the difference in the distance from each camera to the floor, thereby facilitating subject tracking.

Third Embodiment

The third embodiment of the invention will be detailed referring to FIG. 3. In this embodiment, the same components as those in the first embodiment are given the same numerals and signs to avoid duplicate explanation.

The surveillance camera apparatus equipped with a function to control the speed of a rotating body according to the second embodiment of the invention performs arithmetic operation of an optimum speed and converts the current operation speed to the optimum speed based on the operation speed instruction information input from the input operation unit 4 and the information on the orientation of the camera in vertical direction held in the camera main body 1, and drives/controls the rotating body 2 at the optimum speed.

Figure 4:
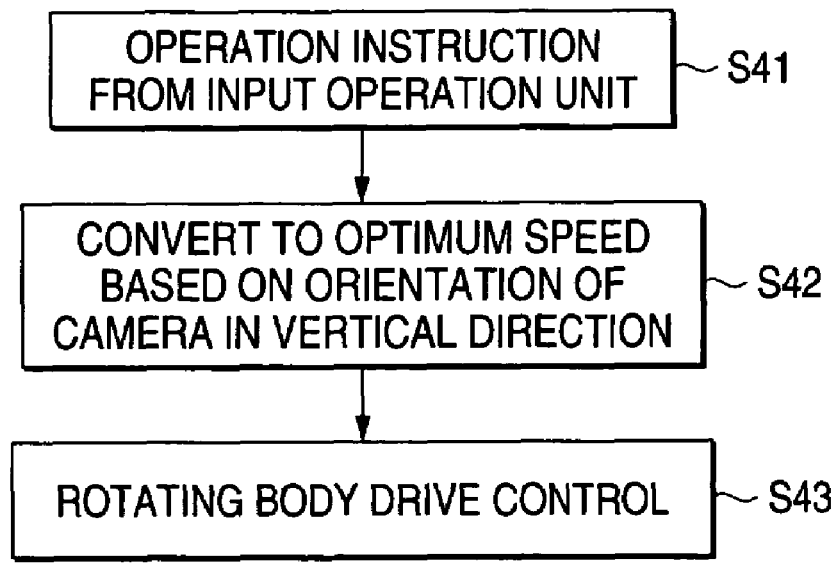
FIG. 4 is a flowchart of speed control of surveillance camera apparatus equipped with a function to control the speed of a rotating body according to the third embodiment of the invention, the speed control being performed by using the information on the orientation of the camera in vertical direction.

FIG. 4 is a flowchart showing the operation of the surveillance camera apparatus equipped with a function to control the speed of a rotating body according to the third embodiment of the invention. The flowchart comprises a first step S41 through a third step S43.

In FIG. 4, the first step S41 is a step of inputting and instructing the operation speed instruction information on the rotating body 2 from the input operation unit 4;

the second step S42 is a step of performing arithmetic operation of an optimum speed based on the operation speed instruction information and the information on the orientation of the camera in vertical direction and converting the current operation speed to the optimum speed; and the third step S43 is a step of driving the rotating body 2.

Next, the operation of the thus configured surveillance camera apparatus equipped with a function to control the speed of a rotating body according to the third embodiment of the invention will be described.

(1) In the first step S41, same as the first step S21 in the first embodiment, the operation speed instruction information on the rotating body 2 is input and instructed to the controller 3 by the input operation unit 4 shown in FIG. 1.

(2) In the second step S42, information on the orientation of the camera main body 1 in vertical direction held by the data holding means 33, that is, the information on the angle of the camera orientation in vertical direction, and the operation speed instruction information determined by the operation determination means 31 are input to the main control means 35. From these input information, the main control means 35 performs arithmetic operation of an optimum operation speed of the rotating body 2 to track the subject by using an appropriate arithmetic expression and converts the current operation speed to the resulting optimum speed.

(3) In the third step S43, same as the third step S23 in the first embodiment, a control signal corresponding to the optimum operation speed calculated by the main control means 35 of the controller 3 in the second step S42 is output and instructed to the drive means 36, which outputs a drive signal to drive the rotating body 2 to start rotation. That is, the rotating body 2 is rotated vertically and/or horizontally at the operation speed mentioned above to track the subject.

In this way, the rotating body is driven and controlled by using information on top of the operation speed input and instructed by the input operation unit 4 and the zooming magnification information. The rotating body 2 is controlled by using the operation speed information and the information on the orientation of the camera in vertical direction as status information held by the controller 3 to convert, in the interior of the camera, the current operation speed to an appropriate subject tracking speed, thereby driving the rotating body.

As mentioned earlier, according to the third embodiment of the invention, the rotating body 2 of the surveillance camera apparatus equipped with a function to control the speed of a rotating body is controlled by using the operation speed instruction data from the input operation unit 4 and the information on the orientation of the camera in vertical direction held by the controller 3 to convert, in the controller 3 of the camera, the current operation speed to an appropriate tracking speed. That is, according to the third embodiment of the invention, the rotating body 2 is driven by using information on top of the zooming magnification information. An optimum operation speed is calculated and the current operation speed is converted to the resulting speed also in accordance with the angle of the camera orientation in vertical direction. It is thus possible to drive the rotating body 2 at the operation speed which facilitates subject tracking.

Thus, in case a subject passes directly below the camera or through its neighborhood from a distance and moves away in subject tracking, the same operability is obtained at any time without experiencing a difference in the operability caused by the difference in the camera angle in vertical direction, thereby facilitating subject tracking.

Fourth Embodiment

Figure 5:
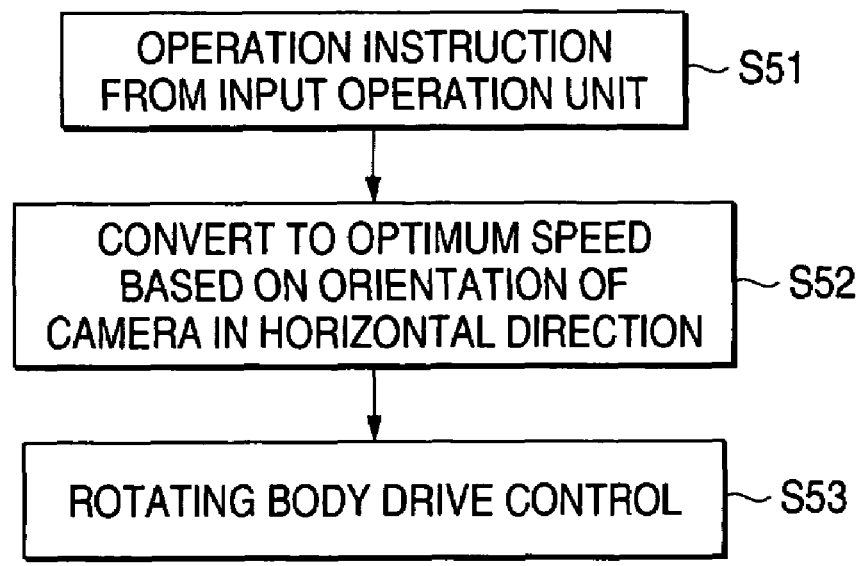
FIG. 5 is a flowchart of speed control of surveillance camera apparatus equipped with a function to control the speed of a rotating body according to the fourth embodiment of the invention, the speed control being performed by using the information on the orientation of the camera in horizontal direction.

The fourth embodiment of the invention will be detailed referring to FIG. 5. In this embodiment, the same components as those in the first embodiment are given the same numerals and signs to avoid duplicate explanation.

The surveillance camera apparatus equipped with a function to control the speed of a rotating body according to the fourth embodiment of the invention performs arithmetic operation of an optimum speed and converts the current operation speed to the optimum speed based on the operation speed instruction information input and instructed from the input operation unit 4 and the information on the orientation of the camera in horizontal direction as status information held in the controller 3, and drives/controls the rotating body 2 at the optimum speed.

FIG. 5 is a flowchart showing the operation of the surveillance camera apparatus equipped with a function to control the speed of a rotating body according to the fourth embodiment of the invention. The flowchart comprises a first step S51 through a third step S53.

In FIG. 5, the first step S51 is a step of inputting and instructing the operation speed instruction information from the input operation unit 4;

the second step S52 is a step of performing arithmetic operation of an optimum speed based on the operation speed instruction information and the information on the orientation of the camera in horizontal direction and converting the current operation speed to the optimum speed; and the third step S53 is a step of driving the rotating body 2.

Next, the operation of the thus configured surveillance camera apparatus equipped with a function to control the speed of a rotating body according to the fourth embodiment of the invention will be described.

(1) In the first step S51, same as the first step S21 in the first embodiment, the operation speed instruction information on the rotating body 2 is input and instructed to the controller 3 by the input operation unit 4 shown in FIG. 1.

(2) In the second step S52, information on the orientation of the camera main body 1 in vertical direction held by the data holding means 33 of the controller 3, that is, the information on the angle of the camera orientation in horizontal direction, and the operation speed instruction information determined by the operation determination means 31 are input to the main control means 35. From these input information, the main control means 35 performs arithmetic operation of an optimum operation speed of the rotating body 2 to track the subject by using an appropriate arithmetic expression and converts the current operation speed to the resulting optimum speed, same as the first embodiment.

(3) In the third step S53, same as the third step S23 in the first embodiment, a control signal corresponding to the optimum operation speed calculated by the main control means 35 of the controller 3 in the second step S52 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the fourth embodiment of the invention, the rotating body 2 is controlled by using the operation speed instruction data from the input operation unit 4 and the information on the orientation of the camera in horizontal direction held by the camera main body 1 to convert, in the interior of the camera, the current operation speed to an appropriate tracking speed. That is, according to the fourth embodiment of the invention, the rotating body 2 is driven by using information on top of the zooming magnification information. An optimum operation speed is calculated and the current operation speed is converted to the resulting speed also in accordance with the angle of the camera orientation in horizontal direction. It is thus possible to drive the rotating body 2 at the operation speed which facilitates subject tracking.

Thus, in case the surveillance distance differs depending on the horizontal angle, for example, the distance to the wall differs with the angle in horizontal direction, the same operability is obtained at any time without experiencing a difference in the operability caused by the difference in the camera angle in horizontal direction, thereby facilitating subject tracking.

Fifth Embodiment

Figure 6:
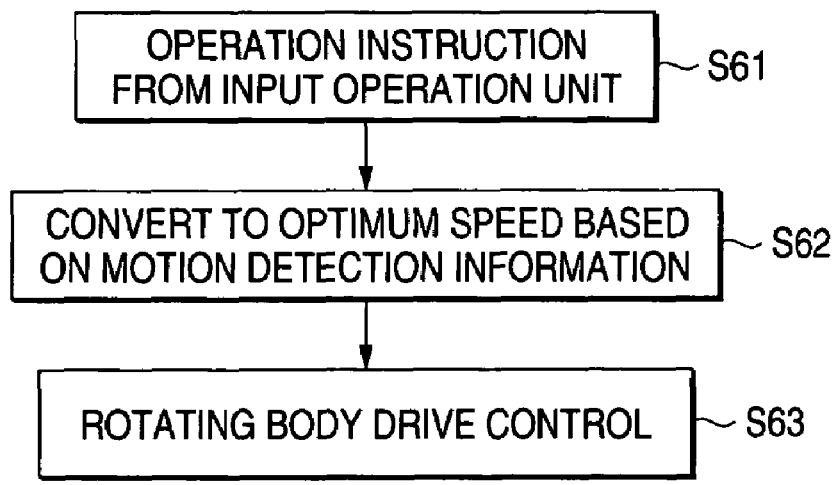
FIG. 6 is a flowchart of speed control of surveillance camera apparatus equipped with a function to control the speed of a rotating body according to the fifth embodiment of the invention, the speed control being performed by using the camera motion detection information.

The fifth embodiment of the invention will be detailed referring to FIG. 6. In this embodiment, the same components as those in the first embodiment are given the same numerals and signs to avoid duplicate explanation.

The surveillance camera apparatus equipped with a function to control the speed of a rotating body according to the fifth embodiment of the invention performs arithmetic operation of an optimum speed and converts the current operation speed to the optimum speed based on the operation speed instruction information input from the input operation unit 4 and the motion detection information on the subject from the camera main body 1 as status information held in the controller 3, and drives/controls the rotating body 2 at the optimum speed.

FIG. 6 is a flowchart showing the operation of the surveillance camera apparatus equipped with a function to control the speed of a rotating body according to the fifth embodiment of the invention. The flowchart comprises a first step S61 through a third step S63.

In FIG. 6, the first step S61 is a step of inputting and instructing the operation speed instruction information from the input operation unit 4;

the second step S62 is a step of performing arithmetic operation of an optimum speed based on the operation speed instruction information and the information on the motion detection information and converting the current operation speed to the optimum speed; and the third step S63 is a step of driving the rotating body 2.

Next, the operation of the thus configured surveillance camera apparatus equipped with a function to control the speed of a rotating body according to the fifth embodiment of the invention will be described.

(1) In the first step S61, same as the first step S21 in the first embodiment, the operation speed instruction information on the rotating body 2 is input and instructed to the controller 3 by the input operation unit 4 shown in FIG. 1.

(2) In the second step S62, the motion detection information on the camera main body 1 held by the data holding means 33 of the controller 3, that is, the information on the destination of the subject on the monitor screen, and the operation speed instruction information determined by the operation determination means 31 are input to the main control means 35. From these input information, the main control means 35 performs arithmetic operation of an optimum operation speed of the rotating body 2 to track the subject by using an appropriate arithmetic expression and converts the current operation speed to the resulting optimum speed, same as the first embodiment.

(3) In the third step S63, same as the third step S23 in the first embodiment, a control signal corresponding to the optimum operation speed calculated by the main control means 35 of the controller 3 in the second step S62 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the fifth embodiment of the invention, the rotating body 2 is controlled by using the operation speed instruction data from the input operation unit 4 and the information on motion detection within the angle of view held by the controller 3 to convert, in the interior of the camera, the current operation speed to an appropriate operation speed. That is, according to the fifth embodiment of the invention, the rotating body 2 is driven by using information on top of the zooming magnification information. An optimum operation speed is calculated and the current operation speed is converted to the resulting speed also in consideration of the information on motion detection of the subject within the angle of view. It is thus possible to drive the rotating body 2 at the operation speed which facilitates subject tracking.

Thus, in case the subject is a walking person or a running person, or in case subjects whose operation speeds differ from each other, such as vehicles, are tracked by a single camera, the same operability is obtained at any time without experiencing a difference in the operability caused by the difference in the operation speed, thereby facilitating subject tracking.

Sixth Embodiment

Figure 7:
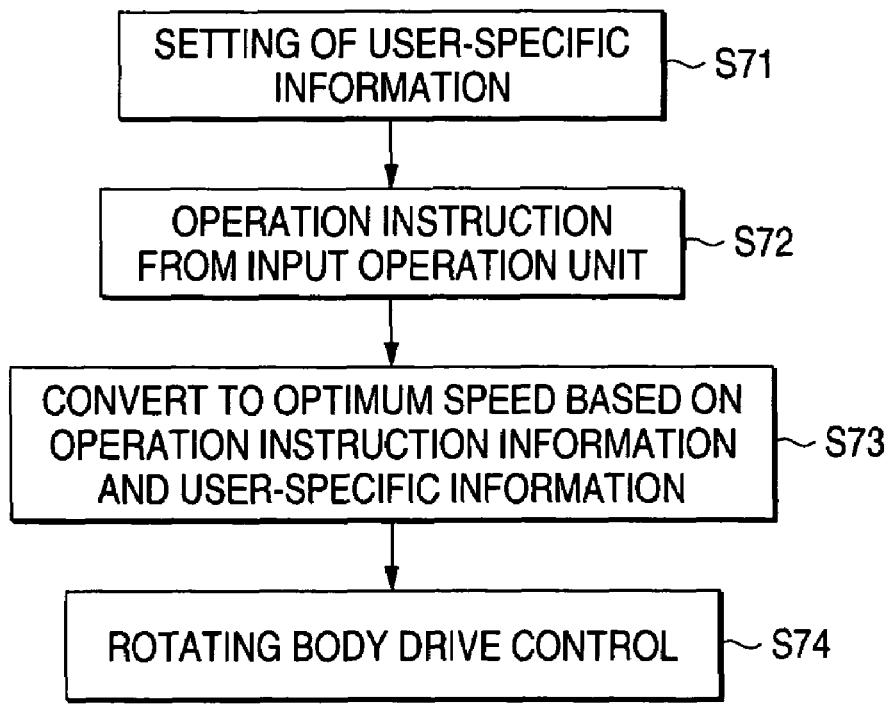
FIG. 7 is a flowchart of speed control of surveillance camera apparatus equipped with a function to control the speed of a rotating body according to the sixth embodiment of the invention, the speed control being performed by using the user-specific information set to the camera.

The fifth embodiment of the invention will be detailed referring to FIG. 7. In this embodiment, the same components as those in the first embodiment are given the same numerals and signs to avoid duplicate explanation.

The surveillance camera apparatus equipped with a function to control the speed of a rotating body according to the sixth embodiment of the invention performs arithmetic operation of an optimum speed and converts the current operation speed to the optimum speed based on the operation speed instruction information as operation instruction information input and instructed from the input operation unit 4 and the user-specific information of the camera held in the camera main body 1, or by the data holding means 33 of the controller 3, or in other words, the information specified and selected by the operator from among a plurality of menus previously provided and held by the camera main body 1 or specific information including the operator's desired numerical values, for example the information where a temporal speed variation is represented in a desired characteristic function, hereinafter referred to as the changing speed information, and drives/controls the rotating body 2 at the optimum speed.

FIG. 7 is a flowchart showing the operation of the surveillance camera apparatus equipped with a function to control the speed of a rotating body according to the sixth embodiment of the invention. The flowchart comprises a first step S71 through a fourth step S74.

In FIG. 7, the first step S71 is a step of previously setting specific information by the user;

the second step S72 is a step of receiving an operation speed instruction from the input operation unit 4;

the third step S73 is a step of converting the current operation speed to an optimum operation speed based on the user-specific information and the speed instruction information; and the fourth step S74 is a step of driving the rotating body 2.

The operation of the thus configured surveillance camera apparatus equipped with a function to control the speed of a rotating body according to the sixth embodiment of the invention will be described.

(1) In the first step S71, the operator inputs to set the changing speed information as user-specific information from the input operation unit 4. The input operation unit 4, in response to the input of the changing speed information, outputs a corresponding signal to the operation determination means 31. The operation determination means 31, receiving this signal, analyzes and determines the signal and outputs the signal to the display signal generation means 32. In this way, the changing speed information as user-specific information is displayed on the monitor unit 5. At the same time, the operation determination means 31 outputs the signal corresponding to the changing speed information to the data holding means 33 as well via the main control means 35. The changing speed information is then stored as user-specific information into the data holding means 33.

(2) In the second step S72, same as the first step S21 in the first embodiment, the operation speed (operation speed instruction information) on the rotating body 2 is input and instructed to the controller 3 by the input operation unit 4.

(3) In the third step S73, the user-specific information held by the data holding means 33, that is, the changing speed information, and the operation speed instruction information input from the input operation unit 4 and determined by the operation determination means 31 are input to the main control means 35. From these input information, the main control means 35 performs arithmetic operation of an optimum operation speed of the rotating body 2 to track the subject by using an appropriate arithmetic expression.

(3) In the fourth step S74, same as the third step S23 in the first embodiment, a speed signal corresponding to the optimum operation speed calculated by the main control means 35 of the camera main body 1 in the third step S73 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the sixth embodiment of the invention, the rotating body 2 is controlled by using the input instruction information and the operation speed and user-specific information to operate the camera main body 1 from the input operation unit 4 to convert, in the interior of the camera, the current operation speed to an optimum operation speed. Thus, the rotating body 2 is rotated by using information on top of the operation speed information. An optimum operation speed is calculated and the current operation speed is converted to the resulting speed also in consideration of the user-specific information to operate the camera. It is thus possible to drive the rotating body 2 at the operation speed which facilitates subject tracking.

Thus, in case a same camera is used in turns by a plurality of persons in separate time zones, the same operability is obtained at any time without experiencing a difference in the operability caused by individual operators, thereby facilitating subject tracking.

Seventh Embodiment

Figure 8:
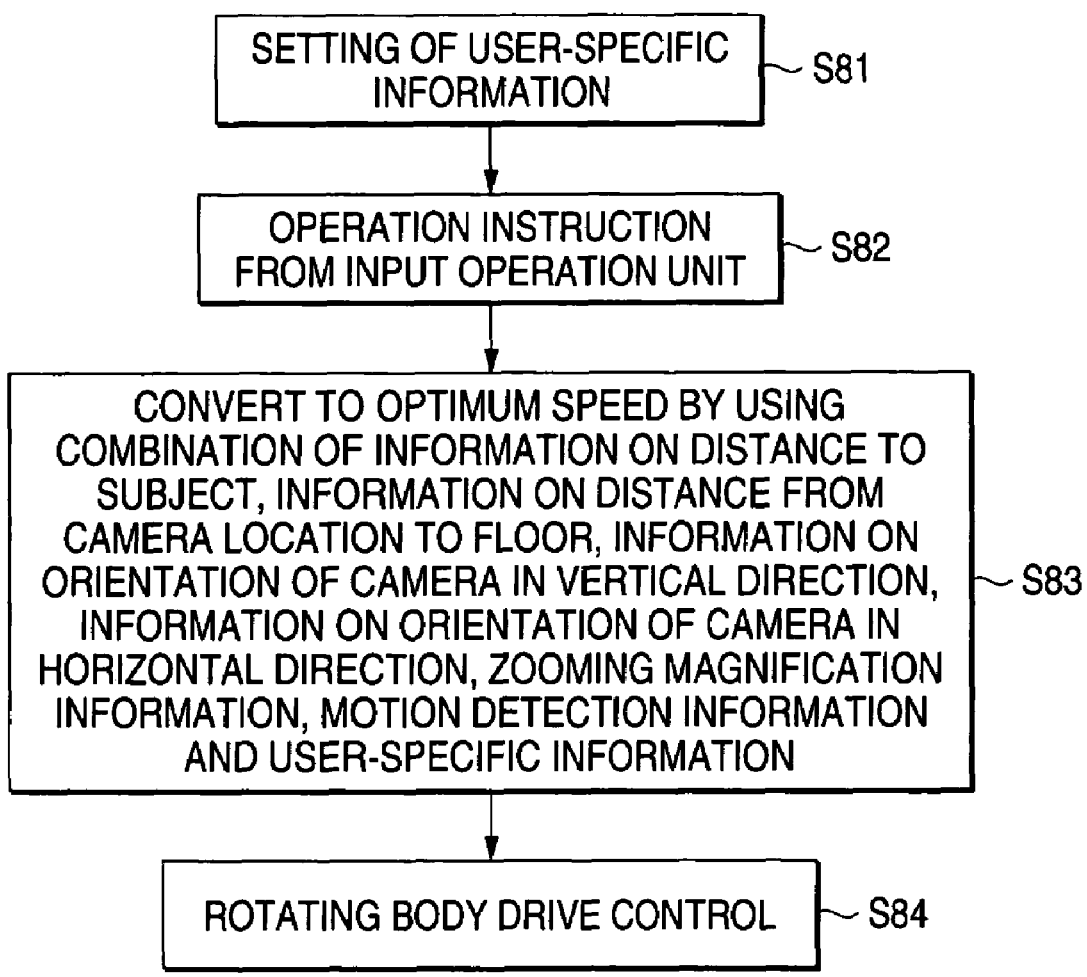
FIG. 8 is a flowchart of speed control of surveillance camera apparatus equipped with a function to control the speed of a rotating body according to the seventh embodiment of the invention, the speed control being performed by using a combination of the information on the distance to the subject, the information on the distance from the camera location to the floor, the information on the orientation of the camera in vertical direction, the information on the orientation of the camera in horizontal direction, the zooming magnification information, the motion detection information, and the user-specific information.

The seventh embodiment of the invention will be detailed referring to FIG. 8. In this embodiment, the same components as those in the first and sixth embodiments are given the same numerals and signs to avoid duplicate explanation.

The surveillance camera apparatus equipped with a function to control the speed of a rotating body according to the seventh embodiment of the invention performs arithmetic operation of an optimum speed and converts the current operation speed to the optimum speed based on a combination of the operation speed instruction information input from the input operation unit 4, the information held in the controller 3 including the information on the distance from the camera main body 1 to the subject, the information on the distance from the camera main body 1 to the floor, the information on the orientation of the camera main body 1 in vertical direction, the information on the orientation of the camera main body 1 in horizontal direction, the motion detection information within the angle of view of the camera main body 1, and the user-specific information, and drives/controls the rotating body 2 at the optimum speed.

FIG. 8 is a flowchart showing the operation of the surveillance camera apparatus equipped with a function to control the speed of a rotating body according to the seventh embodiment of the invention. The flowchart comprises a first step S81 through a fourth step S84.

In FIG. 8, the first step S81 is a step of previously setting specific information by the user;

the second step S82 is a step of receiving an operation speed instruction from the input operation unit 4;

the third step S83 is a step of performing arithmetic operation of an optimum operation speed based on the information on the distance from the camera main body 1 to the subject, the information on the distance from the camera location to the floor, the information on the orientation of the camera main body 1 in vertical direction, the information on the orientation of the camera main body 1 in horizontal direction, the motion detection information within the angle of view of the camera main body 1, and the user-specific information, and converting the current operation speed to the optimum operation speed; and the fourth step S84 is a step of driving the rotating body 2.

Next, the operation of the thus configured surveillance camera apparatus equipped with a function to control the speed of a rotating body according to the seventh embodiment of the invention will be described.

(1) In the first step S81, same as the first step S71 in the sixth embodiment, the operator inputs to set the changing speed information as user-specific information from the input operation unit 4.

The input operation unit 4, in response to the input of the changing speed information, outputs a corresponding signal to the operation determination means 31. The operation determination means 31, receiving this signal, analyzes and determines the signal and outputs the signal to the display signal generation means 32. In this way, the changing speed information as user-specific information is displayed on the monitor unit 5.

At the same time, the operation determination means 31 outputs the signal corresponding to the changing speed information to the data holding means 33 as well via the main control means 35. The changing speed information is then stored as user-specific information into the data holding means 33.

(2) In the second step S82, same as the second step S72 in the sixth embodiment, the operation speed instruction information on the rotating body 2 is input and instructed by the input operation unit 4 shown in FIG. 1.

(3) In the third step S83, a combination of six information items held by the data holding means 33 including the information on the distance from the camera to the subject, the information on the distance from the camera location to the floor, the information on the orientation of the camera in vertical direction, the information on the orientation of the camera in horizontal direction, the motion detection information within the angle of view of the camera, the and user-specific information (respective information items described in the first through sixth embodiments), as well as the operation speed instruction information input from the input operation unit 4 and determined by the operation determination means 31 are input to the main control means 35. From the input information, an optimum operation speed for tracking the subject is calculated based on an appropriate arithmetic expression by the main control means 35, and the current operation speed is converted to the optimum operation speed.

(3) In the fourth step S74, same as the fourth step S74 in the sixth embodiment, a speed signal corresponding to the optimum operation speed calculated by the main control means 35 of the camera main body 1 in the third step S73 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the seventh embodiment of the invention, the rotating body 2 is rotated by using information on top of the operation speed information input and instructed from the input operation unit 4. An optimum operation speed is calculated based on a combination of the distance to the subject, the information on the distance from the camera location to the floor, the information on the orientation of the camera in vertical direction, the information on the orientation of the camera in horizontal direction, the motion detection information and user-specific information, and the current operation speed is converted to the resulting speed so as to drive the rotating body 2. According to this embodiment also, it is possible to drive the rotating body 2 at the operation speed which supports the setting specific to the user of the camera thus facilitating the operator surveillance.

Thus, for example, in case difference types of operability caused by a difference in the camera location, surveillance system and target of surveillance are to be selected and combined depending on the necessity of respective information, the same operability is obtained at any time without experiencing a difference in the operability caused by the difference in the camera location, surveillance system and target of surveillance, thereby facilitating subject tracking.

Eighth Embodiment

Figure 9:
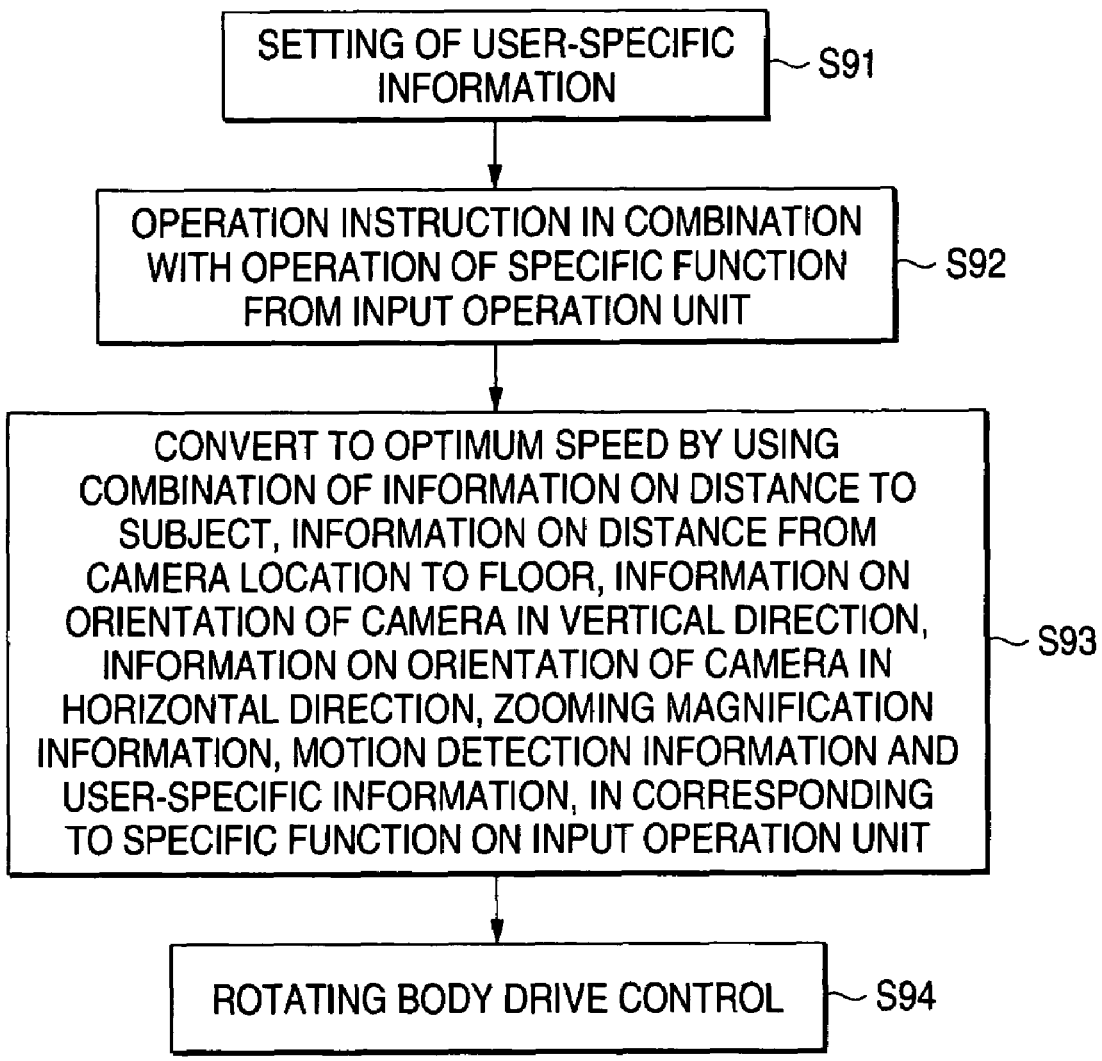
FIG. 9 is a flowchart of speed control of surveillance camera apparatus equipped with a function to control the speed of a rotating body according to the eighth embodiment of the invention, the speed control being performed by using a combination of the information on the distance to the subject, the information on the distance from the camera location to the floor, the information on the orientation of the camera in vertical direction, the information on the orientation of the camera in horizontal direction, the zooming magnification information, the motion detection information, and the user-specific information, in correspondence to a specific function.

The eighth embodiment of the invention will be detailed referring to FIG. 9. In this embodiment, the same components as those in the first, sixth, and seventh embodiments are given the same numerals and signs to avoid duplicate explanation.

The surveillance camera apparatus equipped with a function to control the speed of a rotating body according to the eighth embodiment of the invention performs arithmetic operation of an optimum speed and converts the current operation speed to the optimum speed by using a combination of the operation speed instruction information input from the input operation unit 4, the information held in the controller 3, that is, the information on the distance from the camera main body 1 to the subject, the information on the distance from the camera main body 1 to the floor, the information on the orientation of the camera main body 1 in vertical direction, the information on the orientation of the camera main body 1 in horizontal direction, the motion detection information within the angle of view of the camera main body 1, and the user-specific information, in correspondence to the operation of a specific function on the input operation unit 4, and drives/controls the rotating body 2 at the optimum speed.

FIG. 9 is a flowchart showing the operation of the surveillance camera apparatus equipped with a function to control the speed of a rotating body according to the eighth embodiment of the invention. The flowchart comprises a first step S91 through a fourth step S94.

In FIG. 9, the first step S91 is a step of previously setting specific information by the user;

the second step S92 is a step of receiving an operation speed instruction from the input operation unit 4;

the third step S93 is a step of performing arithmetic operation of an optimum operation speed by using a combination of six information items including the information on the distance from the camera main body 1 to the subject, the information on the distance from the camera location to the floor, the information on the orientation of the camera main body 1 in vertical direction, the information on the orientation of the camera main body 1 in horizontal direction, the motion detection information within the angle of view of the camera main body 1, and the user-specific information, in correspondence to the operation of a specific function on the input operation unit 4, and converting the current operation speed to the optimum operation speed; and the fourth step S94 is a step of driving the rotating body 2.

Next, the operation of the thus configured surveillance camera apparatus equipped with a function to control the speed of a rotating body according to the eighth embodiment of the invention will be described.

(1) In the first step S91, same as the first step S71 in the sixth embodiment, the operator inputs to set the changing speed information as user-specific information from the input operation unit 4.

The input operation unit 4, in response to the input of the changing speed information, outputs a corresponding signal to the operation determination means 31. The operation determination means 31, receiving this signal, analyzes and determines the signal and outputs the signal to the display signal generation means 32. In this way, the changing speed information as user-specific information is displayed on the monitor unit 5. At the same time, the operation determination means 31 outputs the signal corresponding to the changing speed information to the data holding means 33 as well via the main control means 35. The changing speed information is then stored as user-specific information into the data holding means 33.

(2) In the second step S92, input and instruction of information are made to use the operation speed instruction information on the rotating body 2 input to the controller 3 by the input operation unit 4 shown in FIG. 1 in combination with the operation of a specific function.

In case, as a specific function, a button to validate the information on the distance to a subject is used, it is possible to track the subject at an optimum speed obtained by speed conversion using the information on the distance to the subject, within a period the button input is valid.

The button may be used to cancel the information on the distance to the subject.

(3) In the third step S93, a combination of the six information items held by the data holding means 33 including the information on the distance from the camera to the subject, the information on the distance from the camera location to the floor, the information on the orientation of the camera in vertical direction, the information on the orientation of the camera in horizontal direction, the motion detection information within the angle of view of the camera, and the user-specific information (respective information items described in the first through sixth embodiments), as well as the operation speed instruction information input from the input operation unit 4 and determined by the operation determination means 31 are input to the main control means 35, the information corresponding to the operation of a specific function. From the input information, an optimum operation speed of the rotating body 2 for tracking the subject is calculated based on an appropriate arithmetic expression by the main control means 35, and the current operation speed is converted to the optimum operation speed.

(3) In the fourth step S94, same as the fourth step S74 in the sixth embodiment, a speed signal corresponding to the optimum operation speed calculated by the main control means 35 of the camera main body 1 in the third step S93 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the eighth embodiment of the invention, the rotating body 2 is rotated by using information on top of the operation speed information input and instructed from the input operation unit 4 and the zooming magnification information. An optimum operation speed to track a subject is calculated by using a combination of the six information items including the information on the distance from the camera to the subject, the information on the distance from the camera location to the floor, the information on the orientation of the camera in vertical direction, the information on the orientation of the camera in horizontal direction, the motion detection information within the angle of view of the camera, and the user-specific information, as well as the operation speed instruction information input from the input operation unit 4 corresponding to the operation of a specific function. The optimum operation speed is used to drive the rotating body 2.

Thus, for example, in case optimum speed conversion is not required in regular operation but it is required only when detailed tracking is required, speed conversion is made to facilitate subject tracking assuming the information on the specific operation as valid only when the specific operation is under way.

Ninth Embodiment

Figure 10:
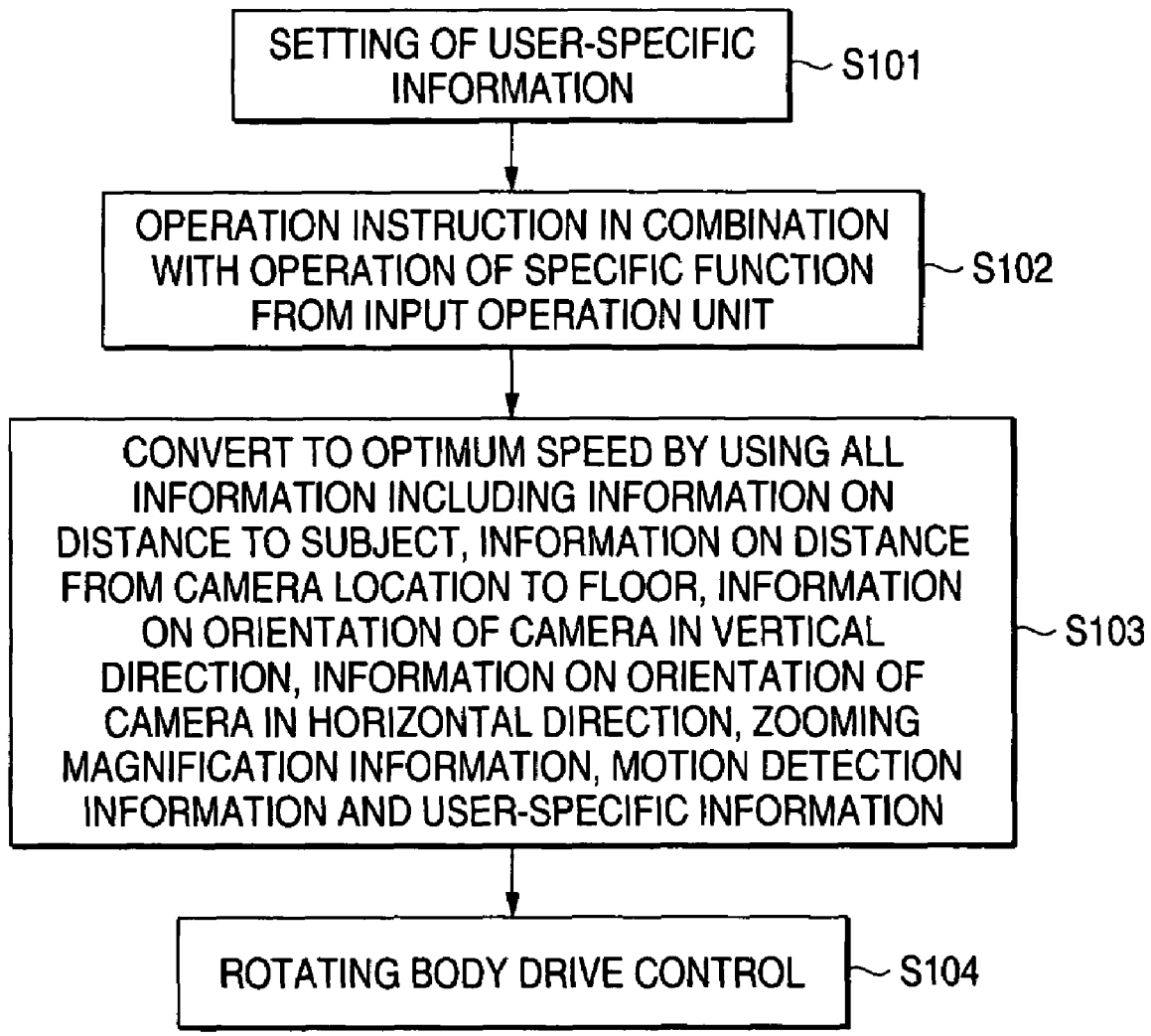
FIG. 10 is a flowchart of speed control of surveillance camera apparatus equipped with a function to control the speed of a rotating body according to the ninth embodiment of the invention, the speed control being performed by using all the information including the information on the distance to the subject, the information on the distance from the camera location to the floor, the information on the orientation of the camera in vertical direction, the information on the orientation of the camera in horizontal direction, the zooming magnification information, the motion detection information, and the user-specific information.

The ninth embodiment of the invention will be detailed referring to FIG. 10. In this embodiment, the same components as those in the first, sixth, and seventh embodiments are given the same numerals and signs to avoid duplicate explanation.

The surveillance camera apparatus equipped with a function to control the speed of a rotating body according to the ninth embodiment of the invention performs arithmetic operation of an optimum speed and converts the current operation speed to the optimum speed by using all the information including the operation speed instruction information input from the input operation unit 4, the information held in the controller 3, that is, the information on the distance from the camera main body 1 to the subject, the information on the distance from the camera main body 1 to the floor, the information on the orientation of the camera main body 1 in vertical direction, the information on the orientation of the camera main body 1 in horizontal direction, the motion detection information within the angle of view of the camera main body 1, and the user-specific information, and drives/controls the rotating body 2 at the optimum speed.

FIG. 10 is a flowchart showing the operation of the surveillance camera apparatus equipped with a function to control the speed of a rotating body according to the ninth embodiment of the invention. The flowchart comprises a first step S101 through a fourth step S104.

In FIG. 10, the first step S101 is a step of previously setting specific information by the user;

the second step S102 is a step of receiving operation speed instruction information as operation instruction information from the input operation unit 4;

the third step S103 is a step of performing arithmetic operation of an optimum operation speed based on all the information including the information on the distance from the camera main body 1 to the subject, the information on the distance from the camera location to the floor, the information on the orientation of the camera main body 1 in vertical direction, the information on the orientation of the camera main body 1 in horizontal direction, the motion detection information within the angle of view of the camera main body 1, and the user-specific information (all the information items described in the first through sixth embodiments), and converting the current operation speed to the optimum operation speed; and the fourth step S104 is a step of driving the rotating body 2.

Next, the operation of the thus configured surveillance camera apparatus equipped with a function to control the speed of a rotating body according to the ninth embodiment of the invention will be described.

(1) In the first step S101, same as the first step S71 in the sixth embodiment, the operator inputs to set the changing speed information as user-specific information from the input operation unit 4.

The input operation unit 4, in response to the input of the changing speed information, outputs a corresponding signal to the operation determination means 31. The operation determination means 31, receiving this signal, analyzes and determines the signal and outputs the signal to the display signal generation means 32. In this way, the changing speed information as user-specific information is displayed on the monitor unit 5.

At the same time, the operation determination means 31 outputs the signal corresponding to the changing speed information to the data holding means 33 as well via the main control means 35. The changing speed information is then stored as user-specific information into the data holding means 33.

(2) In the second step S102, same as the second step S92 in the eighth embodiment, input and instruction of information are made to use the operation speed instruction information on the rotating body 2 input to the controller 3 by the input operation unit 4 shown in FIG. 1 in combination with the operation of a specific function.

In case, as a specific function, a button to validate the information on the distance to a subject is used, it is possible to track the subject at an optimum speed obtained by speed conversion using the information on the distance to the subject, within a period the button input is valid.

(3) In the third step S103, all the information held by the data holding means 33 including the information on the distance from the camera main body 1 to the subject, the information on the distance from the location of the camera main body 1 to the floor, the information on the orientation of the camera main body 1 in vertical direction, the information on the orientation of the camera main body 1 in horizontal direction, the motion detection information within the angle of view of the camera main body 1, and the user-specific information, as well as the operation speed instruction information input from the input operation unit 4 and determined by the operation determination means 31 are input to the main control means 35. From the input information, an optimum operation speed of the rotating body 2 for tracking the subject is calculated based on an appropriate arithmetic expression by the main control means 35.

(3) In the fourth step S104, same as the fourth step S74 in the sixth embodiment, a speed signal corresponding to the optimum operation speed calculated by the main control means 35 of the camera main body 1 in the third step S103 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the ninth embodiment of the invention, the rotating body 2 of the surveillance camera apparatus equipped with a function to control the speed of a rotating body is rotated by using information on top of the operation speed information input and instructed from the input operation unit 4 and the zooming magnification information. An optimum operation speed to track a subject is calculated by using all the information including the information on the distance from the camera to the subject, the information on the distance from the camera location to the floor, the information on the orientation of the camera in vertical direction, the information on the orientation of the camera in horizontal direction, the motion detection information within the angle of view of the camera, and the user-specific information. The optimum operation speed is used to drive the rotating body 2.

Thus, for example, in case optimum speed conversion is not required in regular operation but it is required only when detailed tracking is required, speed conversion is made to facilitate subject tracking assuming all the information as valid only when a specific operation is under way.

Tenth Embodiment

Figure 11:
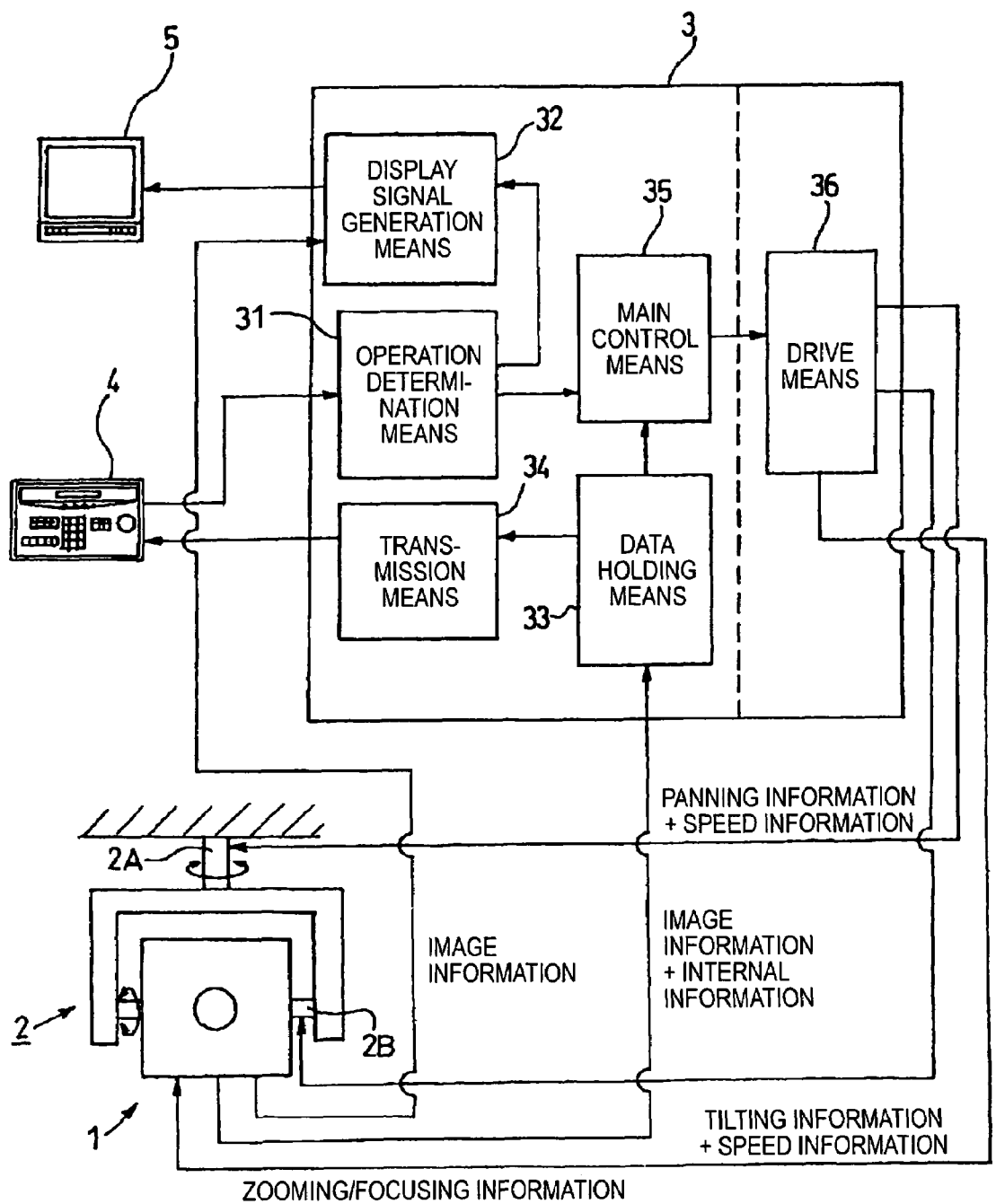
FIG. 11 is a block diagram showing a camera system comprising surveillance camera apparatus equipped with a function to control the speed of a rotating body according to the tenth embodiment of the invention.
Figure 12:
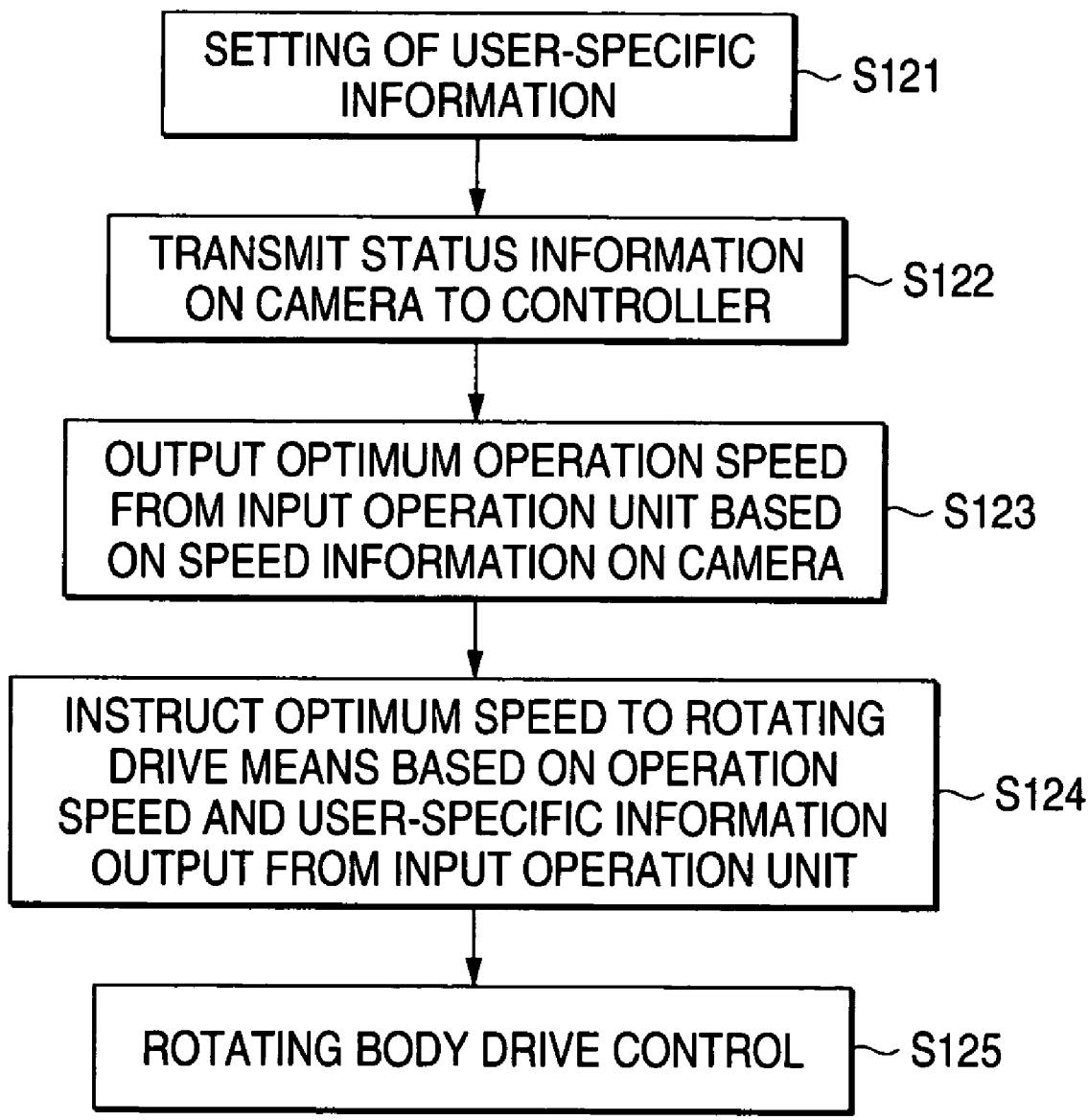
FIG. 12 is a flowchart of speed control of surveillance camera apparatus equipped with a function to control the speed of a rotating body according to the tenth embodiment of the invention, the speed control being performed from the camera controller by transmitting the status information on the camera to the camera controller.

The tenth embodiment of the invention will be detailed referring to FIGS. 11 and 12. In this embodiment, the same components as those in the first, sixth, and seventh embodiments are given the same numerals and signs to avoid duplicate explanation.

The surveillance camera apparatus equipped with a function to control the speed of a rotating body according to the tenth embodiment of the invention performs arithmetic operation of an optimum speed and converts the current operation speed to the optimum speed by transmitting to the input operation unit 4 the operation speed instruction information input from the input operation unit 4, status information on the camera main body 1 held in the data holding means 33 of the controller 3, for example the information on the distance from the camera main body 1 to the floor, the information on the orientation of the camera main body 1 in vertical direction, the information on the orientation of the camera main body 1 in horizontal direction, the motion detection information, and the user-specific information, as well as the internal information in the camera main body 1, and drives/controls the rotating body 2 at the optimum speed.

Thus, the controller 3 comprises transmission means 34 on top of means described in the first embodiment as shown in FIG. 11. The transmission means 34 is means for information on the internal status of the camera main body 1 (hereinafter refereed to as "internal information") such as the focusing information, zooming information, diaphragm information (for example iris diaphragm) information to the input operation unit 4 in real time. The input of the transmission means 34 is connected to the output of the data holding means 33. The output of transmission means 34 is connected to the input of the input operation unit 4.

FIG. 12 is a flowchart showing the operation of the surveillance camera apparatus equipped with a function to control the speed of a rotating body according to the tenth embodiment of the invention. The flowchart comprises a first step S121 through a fourth step S125.

In FIG. 10, the first step S121 is a step of previously setting specific information by the user;

the second step S122 is a step of transmitting the internal information of the camera to the input operation unit 4;

the third step S123 is a step of receiving an operation speed instruction from the input operation unit 4;

the fourth step S124 is a step of performing arithmetic operation of an optimum operation speed by using the operation speed information and the status information of the camera input and instructed from the input operation unit 4 on the controller 3 and instructing the optimum operation speed to the drive means 36; and the fourth step S125 is a step of driving the rotating body 2.

Next, the operation of the thus configured surveillance camera apparatus equipped with a function to control the speed of a rotating body according to the tenth embodiment of the invention will be described.

(1) In the first step S121, same as the first step S71 in the sixth embodiment, the operator inputs to set the changing speed information as user-specific information from the input operation unit 4.

The input operation unit 4, in response to the input of the changing speed information, outputs a corresponding signal to the operation determination means 31. The operation determination means 31, receiving this signal, analyzes and determines the signal and outputs the signal to the display signal generation means 32. In this way, the changing speed information as user-specific information is displayed on the monitor unit 5.

At the same time, the operation determination means 31 outputs the signal corresponding to the changing speed information to the data holding means 33 as well via the main control means 35. The changing speed information is then stored as user-specific information into the data holding means 33.

(2) In the second step S122, at the same the status information of the camera is output from the data holding means 33 of the controller 3 to the main control means 35, the internal information, together with the image information from the camera main body 1, is output to the data holding means 33. The internal information is output from the data holding means 33 to the input operation unit 4 via the transmission means 34.

(3) In the third step S123, the input operation unit 4 which has input the internal information performs arithmetic operation of an optimum operation speed based on an appropriate arithmetic expression, and outputs the optimum operation speed to the operation determination means 31 of the controller 3.

(4) In the fourth step S124, the operation speed output from the input operation unit 4 is analyzed and determined by the operation determination means 31, which outputs the operation speed to the main control means 35. The main control means 35 outputs and instructs the optimum operation speed output from the input operation unit 4 to the drive means 36.

(5) In the fifth step S125, the rotating body 2 is driven and controlled at the optimum operation speed output and instructed to the drive means 36 from the main control means 35 in the fourth step S124.

In this way, according to the tenth embodiment, the internal information of the camera main body 1 is transmitted from the controller 3 to the input operation unit 4. The operation unit 4 outputs optimum operation speed instruction information to the controller 3 based on the user-specific information as well as the internal information. Thus, the input operation unit 4 to operate the camera is capable of calculate an optimum operation speed which facilitates subjects tracking and controlling the rotating body 2 at the operation speed while grasping the internal information of the camera 2.

As a result, even for a low-cost camera which cannot mount a speed control function, the controller can generate operation instruction information facilitating subject tracking so as to facilitate tracking of a subject, by providing the controller with status information.

Eleventh Embodiment

Figure 13:
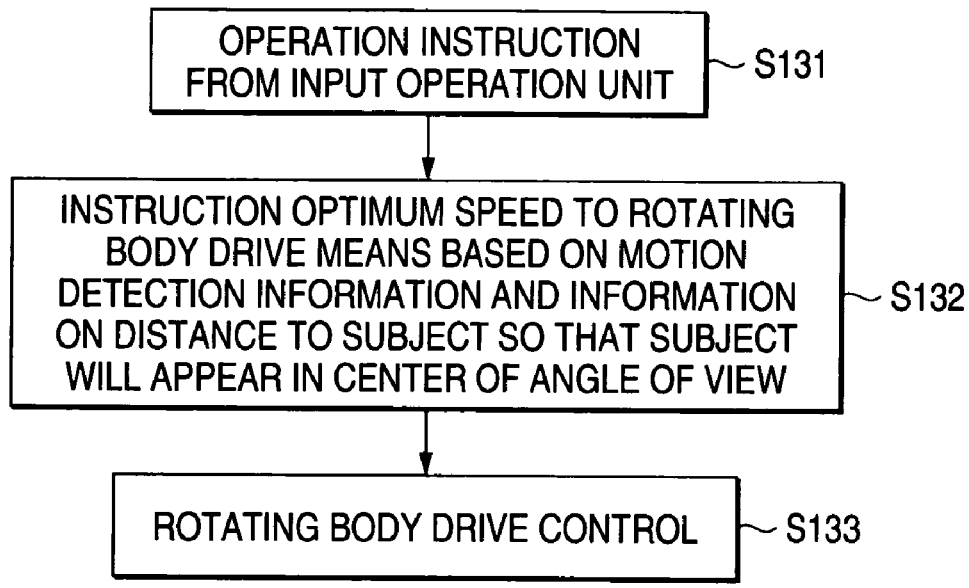
FIG. 13 is a flowchart of speed control of surveillance camera apparatus equipped with a function to control the speed of a rotating body according to the eleventh embodiment of the invention, the speed control being performed by using the camera motion detection information and the information on the distance to the subject as well as the operation instruction from the camera controller so that the subject will appear in the center of the angle of view.

The eleventh embodiment of the invention will be detailed referring to FIG. 13. In this embodiment, the same components as those in the first embodiment are given the same numerals and signs to avoid duplicate explanation.

The surveillance camera apparatus equipped with a function to control the speed of a rotating body according to the eleventh embodiment of the invention rotates the rotating body 2 so that the subject will first appear in the center of the angle of view, by using the operation speed instruction information input from the input operation unit 4, the camera motion detection information held in the controller 3, and the information on the distance to the subject.

FIG. 13 is a flowchart showing the operation of the surveillance camera apparatus equipped with a function to control the speed of a rotating body according to the eleventh embodiment of the invention. The flowchart comprises a first step S131 through a third step S133.

In FIG. 13, the first step S131 is a step of receiving operation speed instruction information on the rotating body 2 from the input operation unit 4;

the second step S132 is a step of performing arithmetic operation of an optimum operation speed and converting the speed of the rotating body 2 on the controller 3 so that the subject will first appear in the center of the angle of view, by using the camera motion detection information, the information on the distance to the subject, and the operation speed instruction information input from the input operation unit 4; and the third step S133 is a step of driving the rotating body 2.

The operation of the thus configured surveillance camera apparatus equipped with a function to control the speed of a rotating body according to the eleventh embodiment of the invention will be described.

(1) In the first step S131, same as the first step S21 in the first embodiment, the operation speed (operation speed instruction information) on the rotating body 2 is input and instructed to the controller 3 by the input operation unit 4 shown in FIG. 1.

(2) In the second step S132, the camera motion detection information and the information on the distance from the camera to the subject held by the data holding means 33 of the controller 3 and the operation speed instruction information input from the input operation unit 4 and determined by the operation determination means 31 are used to make control so that the subject will first appear in the center of the angle of view. Thus the main control means 35 performs arithmetic operation of the operation speed of the rotating body 2 based on an appropriate arithmetic expression.

(3) In the third step S133, same as the third step S23 in the first embodiment, a speed signal corresponding to the optimum operation speed calculated by the main control means 35 of the controller 3 in the second step S132 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the eleventh embodiment of the invention, the rotating body 2 of the surveillance camera apparatus equipped with a function to control the speed of a rotating body is controlled by using information on top of the operation speed instruction information and the camera motion detection information from the camera controller. The operation speed instruction information from the camera controller and also the motion detection information and the information on the distance to the subject are used to make control so that the subject will first appear in the center of the angle of view. This allows the subject to be moved in the center of the angle of view in accordance with the motion detection and the distance to the subject, thus facilitating subject tracking.

Thus, in case the controller is likely to be operated in excess to place a subject out of the angle of view at the moment tracking of the subject has started, subject tracking is made easy because the subject appears in the center of the angle of view and proper focus is attained just after subject tracking is started.

Twelfth Embodiment

Figure 14:
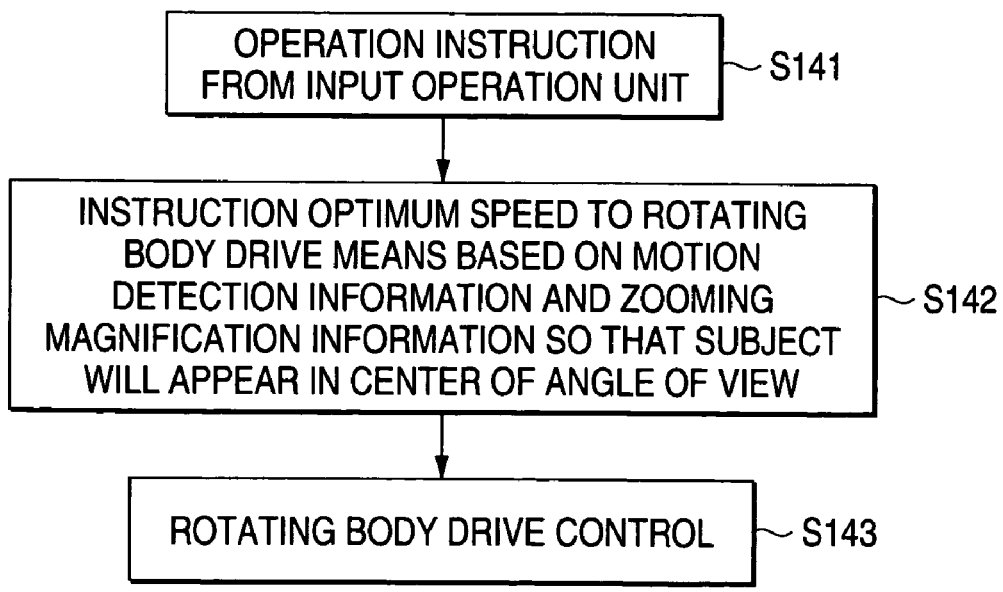
FIG. 14 is a flowchart of speed control of surveillance camera apparatus equipped with a function to control the speed of a rotating body according to the twelfth embodiment of the invention, the speed control being performed by using the camera motion detection information and the zooming magnification information as well as the operation instruction from the camera controller so that the subject will appear in the center of the angle of view.

The twelfth embodiment of the invention will be detailed referring to FIG. 14. In this embodiment, the same components as those in the first and eleventh embodiments are given the same numerals and signs to avoid duplicate explanation.

The surveillance camera apparatus equipped with a function to control the speed of a rotating body according to the twelfth embodiment of the invention rotates the rotating body 2 so that the subject will first appear in the center of the angle of view, by using the operation speed instruction information as operation instruction information input from the input operation unit 4, the camera motion detection information held in the controller 3, and zooming magnification information as internal information of the camera main body 1.

FIG. 14 is a flowchart showing the operation of the surveillance camera apparatus equipped with a function to control the speed of a rotating body according to the twelfth embodiment of the invention. The flowchart comprises a first step S141 through a third step S143.

In FIG. 14, the first step S141 is a step of receiving operation speed instruction information on the rotating body 2 from the input operation unit 4;

the second step S142 is a step of performing arithmetic operation of an optimum operation speed and converting the speed of the rotating body 2 on the controller 3 so that the subject will first appear in the center of the angle of view, by using the camera motion detection information, the zooming magnification information and the operation speed instruction information input from the input operation unit 4; and the third step S143 is a step of driving the rotating body 2.

The operation of the thus configured surveillance camera apparatus equipped with a function to control the speed of a rotating body according to the twelfth embodiment of the invention will be described.

(1) In the first step S141, same as the first step S131 in the eleventh embodiment, the operation speed (operation speed instruction information) on the rotating body 2 is input and instructed to the controller 3 by the input operation unit 4 shown in FIG. 1.

(2) In the second step S142, the camera motion detection information and the zooming magnification information held by the data holding means 33 of the controller 3 and the operation speed instruction information input from the input operation unit 4 and determined by the operation determination means 31 are used to make control so that the subject will first appear in the center of the angle of view. Thus the main control means 35 performs arithmetic operation of the operation speed of the rotating body 2 based on an appropriate arithmetic expression and converts the current operation speed to the value obtained.

(3) In the third step S143, same as the third step S133 in the eleventh embodiment, a speed signal corresponding to the optimum operation speed calculated by the main control means 35 of the controller 3 in the second step S142 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the twelfth embodiment of the invention, the rotating body 2 of the surveillance camera apparatus equipped with a function to control the speed of a rotating body is controlled by using information on top of the operation speed instruction information and the camera motion detection information from the input operation unit 4. The operation speed instruction information from the input operation unit 4 and also the motion detection information as status information and the zooming magnification information as internal information of the camera main body 1 are used to make control so that the subject will first appear in the center of the angle of view. This allows the subject to be moved in the center of the angle of view in accordance with the motion detection and the distance to the subject, thus facilitating subject tracking.

Thus, in case the controller is likely to be operated in excess to place a subject out of the angle of view at the moment tracking of the subject has started, subject tracking is made easy because the subject appears in the center of the angle of view and proper focus is attained just after subject tracking is started.

Thirteenth Embodiment

Figure 15:
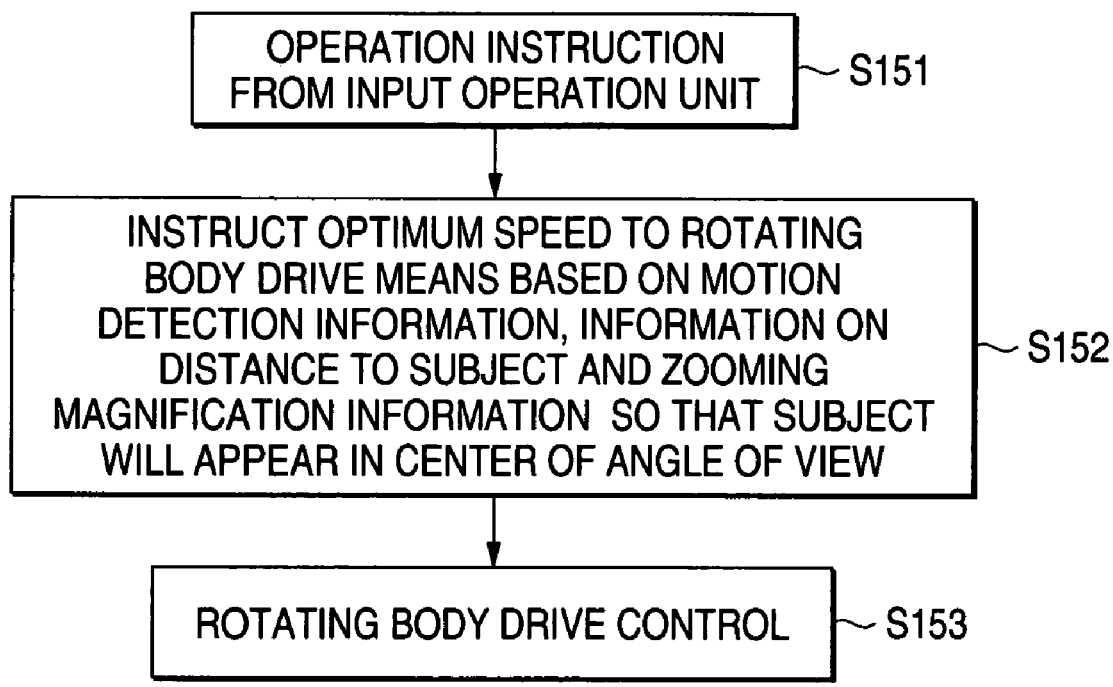
FIG. 15 is a flowchart of speed control of surveillance camera apparatus equipped with a function to control the speed of a rotating body according to the thirteenth embodiment of the invention, the speed control being performed by using the camera motion detection information, the information on the distance to the subject, and the zooming magnification information as well as the operation instruction from the camera controller so that the subject will appear in the center of the angle of view.

The thirteenth embodiment of the invention will be detailed referring to FIG. 15. In this embodiment, the same components as those in the first, eleventh and twelfth embodiments are given the same numerals and signs to avoid duplicate explanation.

The surveillance camera apparatus equipped with a function to control the speed of a rotating body according to the thirteenth embodiment of the invention rotates the rotating body 2 so that the subject will first appear in the center of the angle of view, by using the operation speed instruction information as operation instruction information input from the input operation unit 4, the motion detection information as status information on the camera held in the controller 3, and zooming magnification information as internal information of the camera main body 1.

FIG. 15 is a flowchart showing the operation of the surveillance camera apparatus equipped with a function to control the speed of a rotating body according to the thirteenth embodiment of the invention. The flowchart comprises a first step S151 through a third step S153.

In FIG. 15, the first step S151 is a step of receiving operation speed instruction information on the rotating body 2 from the input operation unit 4;

the second step S152 is a step of performing arithmetic operation of an optimum operation speed and converting the speed of the rotating body 2 on the controller 3 so that the subject will first appear in the center of the angle of view, by using the camera motion detection information, the information on the distance to the subject, the zooming magnification information and the operation speed instruction information input from the input operation unit 4; and the third step S153 is a step of driving the rotating body 2.

The operation of the thus configured surveillance camera apparatus equipped with a function to control the speed of a rotating body according to the thirteenth embodiment of the invention will be described.

(1) In the first step S151, same as the first step S131 in the eleventh embodiment, the operation speed (operation speed instruction information) on the rotating body 2 is input and instructed to the controller 3 by the input operation unit 4 shown in FIG. 1.

(2) In the second step S152, the camera motion detection information, information on the distance to the subject and the zooming magnification information held by the data holding means 33 of the controller 3 and the operation speed instruction information input from the input operation unit 4 and determined by the operation determination means 31 are used to make control so that the subject will first appear in the center of the angle of view. Thus the main control means 35 performs arithmetic operation of the operation speed of the rotating body 2 based on an appropriate arithmetic expression and converts the current operation speed to the value obtained.

(3) In the third step S153, same as the third step S133 in the eleventh embodiment, a speed signal corresponding to the optimum operation speed calculated by the main control means 35 of the controller 3 in the second step S152 is output and instructed to the drive means 36, which outputs a drive signal to drive the rotating body 2 to start rotation. That is, the rotating body 2 is rotated vertically and/or horizontally at the operation speed mentioned above to track the subject.

As mentioned earlier, according to the thirteenth embodiment of the invention, the rotating body 2 of the surveillance camera apparatus equipped with a function to control the speed of a rotating body is controlled by using information on top of the operation speed instruction information and the camera motion detection information from the input operation unit 4. The operation speed instruction information as operation instruction information from the input operation unit 4 and also the motion detection information as status information, the information on the distance to the subject and the zooming magnification information as internal information of the camera main body 1 are used to make control so that the subject will first appear in the center of the angle of view. This allows the subject to be moved in the center of the angle of view in accordance with the motion detection and the distance to the subject, thus facilitating subject tracking.

Thus, in case the controller is likely to be operated in excess to place a subject out of the angle of view at the moment tracking of the subject has started, subject tracking is made easy because the subject appears in the center of the angle of view and proper focus is attained just after subject tracking is started.

While the camera main body 1 and the controller 3 are integrated in a camera enclosure (not shown) in any embodiment of the invention, these may be separated and the controller 3 may be integrated with the input operation unit 4. Alternatively, the controller 3 may be integrated with the monitor unit 5. The controller 3, the input operation unit 4 and the monitor unit 5 may be housed in a single enclosure.

While the camera main body 1 and the rotating body 2 are connected to the controller 3, the input operation unit 4 and the monitor unit 5 using a wire-rod such as a cable, wireless connection is also available.

As understood from the foregoing description, camera apparatus according to the invention comprises: a camera for photographing a subject; a rotating body for rotating the camera in order to track the subject; and a controller for controlling the motion of the rotating body and the photographing operation of the camera; characterized in that the controller comprises: operation determination means for analyzing and determining the input operation instruction information on the rotating body and the camera; data holding means for holding the status information on the photographing operation of the camera; main control means for calculating an optimum speed to track the subject based on the information output from the operation determination means and the data holding means and outputting the speed to the rotating body; and drive means for driving the rotating body.

The rotating body of a camera is not controlled at a uniform speed in accordance with the zoom magnification information and the motion detection information alone, but at an optimum speed depending on the camera location, environment of the camera location, and the status of the subject. This provides an advantage of easy speed control during subject tracking.

According to the invention, the camera comprises operation determination means and data holding means so that a system including a plurality of cameras assures the same operability.

What is claimed is:

1. Camera apparatus comprising: a camera for photographing a subject; a rotating body for rotating said camera in order to track said subject; and a controller for controlling the motion of said rotating body and a photographing operation of the camera;

wherein said controller comprises:

operation determination means for analyzing and determining input operation instruction information on said rotating body and said camera;

data holding means for holding status information on the photographing operation of the camera, wherein the status information includes a distance from the camera to at least one of the subject and a floor, and further wherein said distance is obtained based on a focusing control operation;

main control means for calculating an optimum speed to track said subject based on the information output from said operation determination means and said data holding means and outputting the speed to said rotating body, wherein said information output from said data holding means includes the distance from the camera to said at least one of the subject and the floor; and drive means for driving said rotating body.

2. The camera apparatus according to claim 1, wherein said information output from said data holding means includes both of the distance from said camera to the subject and the distance from the camera to the floor.

3. The camera apparatus according to claim 1, wherein said data holding means holds information on an orientation of said rotating body in the vertical direction as said status information to be output to said main control means.

4. The camera apparatus according to claim 1, wherein said data holding means holds information on an orientation of said rotating body in the horizontal direction as said status information to be output to said main control means.

5. The camera apparatus according to claim 1, wherein said data holding means holds information on motion detection information on said rotating body as said status information to be output to said main control means.

6. The camera apparatus according to claim 1, wherein said data holding means holds specific information as said status information to be output to said main control means.

7. The camera apparatus according to claim 1, wherein said information output from said data holding means further includes at least one of information on an orientation in the vertical direction, information on an orientation in the horizontal direction, zooming magnification information as internal information of said camera, motion detection information, and user-specific information.

8. The camera apparatus according to claim 7, wherein said information output from said data holding means corresponds to a specific function.

9. The camera apparatus according to claim 1, wherein said data holding means holds all of said information on the distance to the subject, said information on the distance to the floor, information on an orientation in vertical direction, information on an orientation in horizontal direction, zooming magnification information, motion detection information, and user-specific information, as said status information to be output to said main control means.

10. A camera apparatus as in any one of claims 1, 2, 3, 4, 5, 6, 7, 8, or 9, further comprising:

a display unit for displaying image information from the camera and at least any of said status information, operation instruction information, and user-specific information set to said camera in accordance with an instruction from the operation determination means and that said controller comprises display signal generation means for displaying said information on said display unit.

11. The camera apparatus according to claim 10, wherein said controller comprises:

transmission means for outputting said status information held by said data holding means to an input operation unit for inputting operation instruction information to said controller in order to perform operation on said rotating body and said camera and that said controller outputs internal information of said camera held by said data holding means to said input operation unit via said transmission means.

12. A method for controlling a camera system comprising the steps of:

providing the camera system, said camera system including a camera for photographing a subject; a rotating body for rotating said camera in order to track said subject; a controller for controlling the motion of said rotating body and a photographing operation of said camera; and an input operation unit for inputting operation instruction information to said controller in order to perform operation on said rotating body and said camera;

wherein said controller comprises: operation determination means for analyzing and determining said operation instruction information input from said input operation unit; data holding means for holding status information on the photographing operation of the camera; main control means for calculating an optimum speed to track said subject based on the information from said operation determination means and said data holding means and outputting the speed to said rotating body; and drive means for driving said rotating body; and controlling said rotating body via the main control means so that said subject will first appear in a center of an angle of view based on camera motion detection information and information on the distance to the subject obtained based on a focusing control operation as information to be output from said data holding means to said main control.

13. A method of claim 12, wherein the step of controlling is further based on zooming magnification information as internal information of the camera.

14. A method of claim 13, wherein the step of controlling is further based on focusing information as internal information of the camera.

* * * * *